United States Patent
Stevenson et al.

(10) Patent No.: US 6,631,156 B1
(45) Date of Patent: Oct. 7, 2003

(54) DIGITAL DATA COMMUNICATIONS SYSTEM

(75) Inventors: J. Mark Stevenson, San Diego, CA (US); Susan G. Briest, San Diego, CA (US); Alan Fronk, Oceanside, CA (US); William H. Marn, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/406,465

(22) Filed: Sep. 27, 1999

(51) Int. Cl.[7] .............. H04B 1/69; H04B 7/10; H04B 11/00
(52) U.S. Cl. ............ 375/140; 375/347; 367/131
(58) Field of Search ............ 342/354; 375/140; 367/4; 370/320, 342

(56) References Cited

U.S. PATENT DOCUMENTS

| | | | | |
|---|---|---|---|---|
| 4,492,875 A | * | 1/1985 | Rowe | 290/44 |
| 5,555,260 A | * | 9/1996 | Rinnback et al. | 370/342 |
| 5,663,927 A | * | 9/1997 | Olson et al. | 367/4 |
| 5,859,874 A | * | 1/1999 | Wiedeman et al. | 370/320 |
| 5,999,561 A | * | 12/1999 | Naden et al. | 370/320 |
| 6,125,080 A | * | 9/2000 | Sonnenschein et al. | 342/354 |
| 6,272,190 B1 | * | 8/2001 | Campana, Jr. | 367/4 |

* cited by examiner

*Primary Examiner*—Stephen Chin
*Assistant Examiner*—Lawrence Williams
(74) *Attorney, Agent, or Firm*—Michael A. Kagan; Peter A. Lipovsky; Allan Y. Lee

(57) ABSTRACT

A communications node includes a controller for 1) initializing a counter and resetting a FIFO buffer; 2) determining if a predetermined number of data packets have been transmitted; 3) transmitting the data packets after the FIFO buffer is partially filled if the number of data packets transmitted is less than the predetermined number, incrementing the counter, and returning to step (2); 4) directing a transceiver to be in a receive mode if the predetermined number of data packets have been transmitted; 5) determining if a command signal has been detected; 6) processing a backlink command if a command signal has been detected, and then directing the transceiver to be in transmit mode, clearing the counter, and returning to step(2); and 7) setting the receiver in a transmit mode if no command signal has been detected, and then clearing the counter and returning to step (2).

4 Claims, 27 Drawing Sheets

FIG. 6 | FIG. 6A | FIG. 6B | FIG. 6C    FIG. 6A
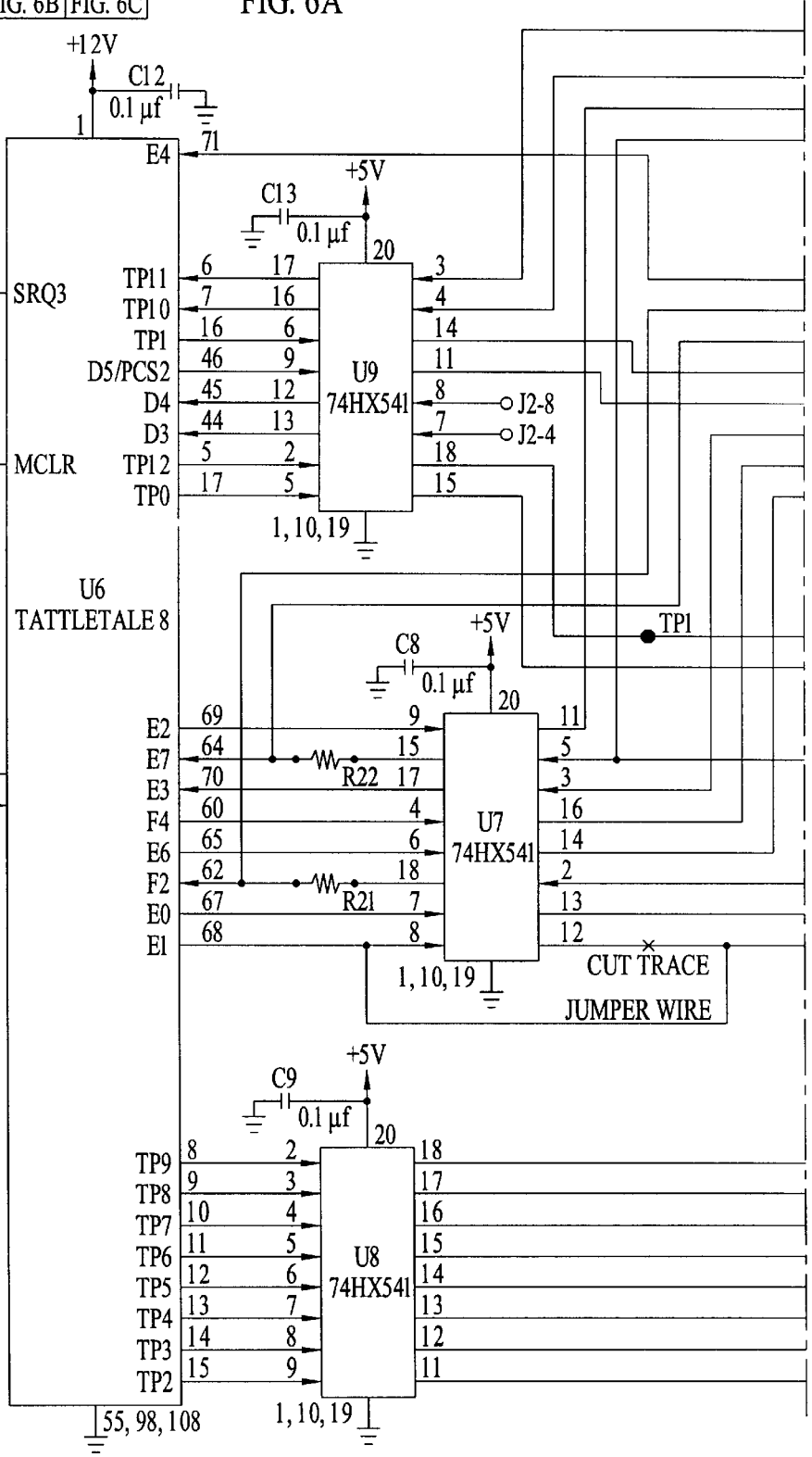

| FIG. 7A | FIG. 7B |

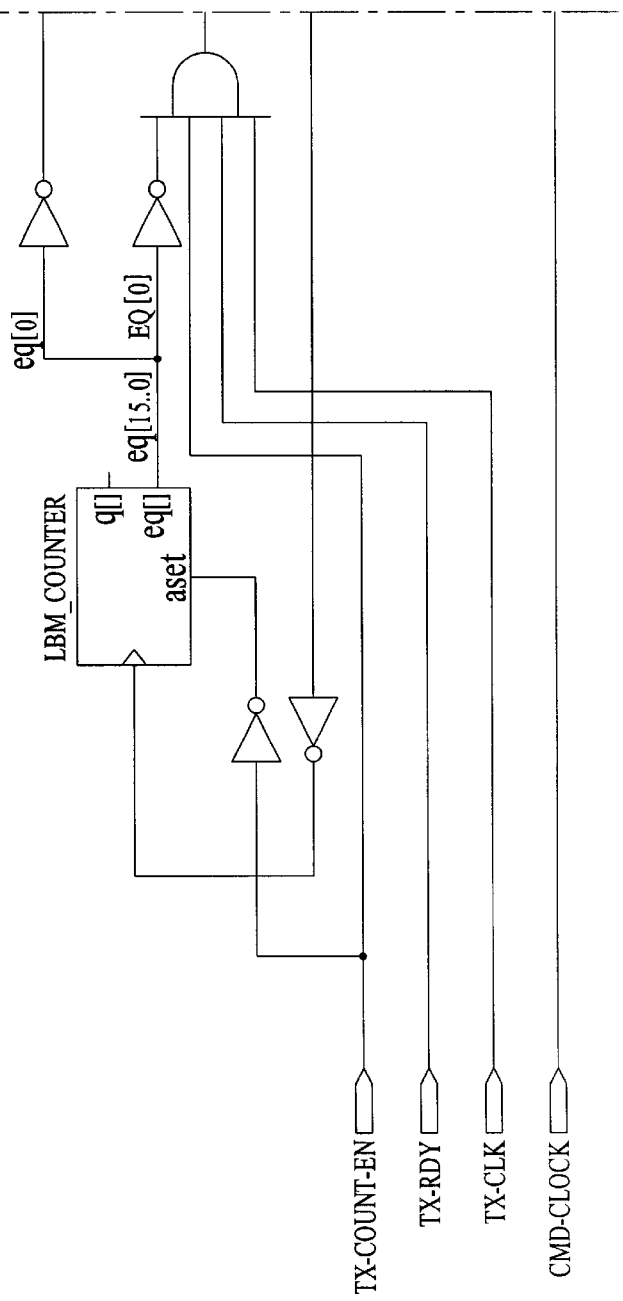

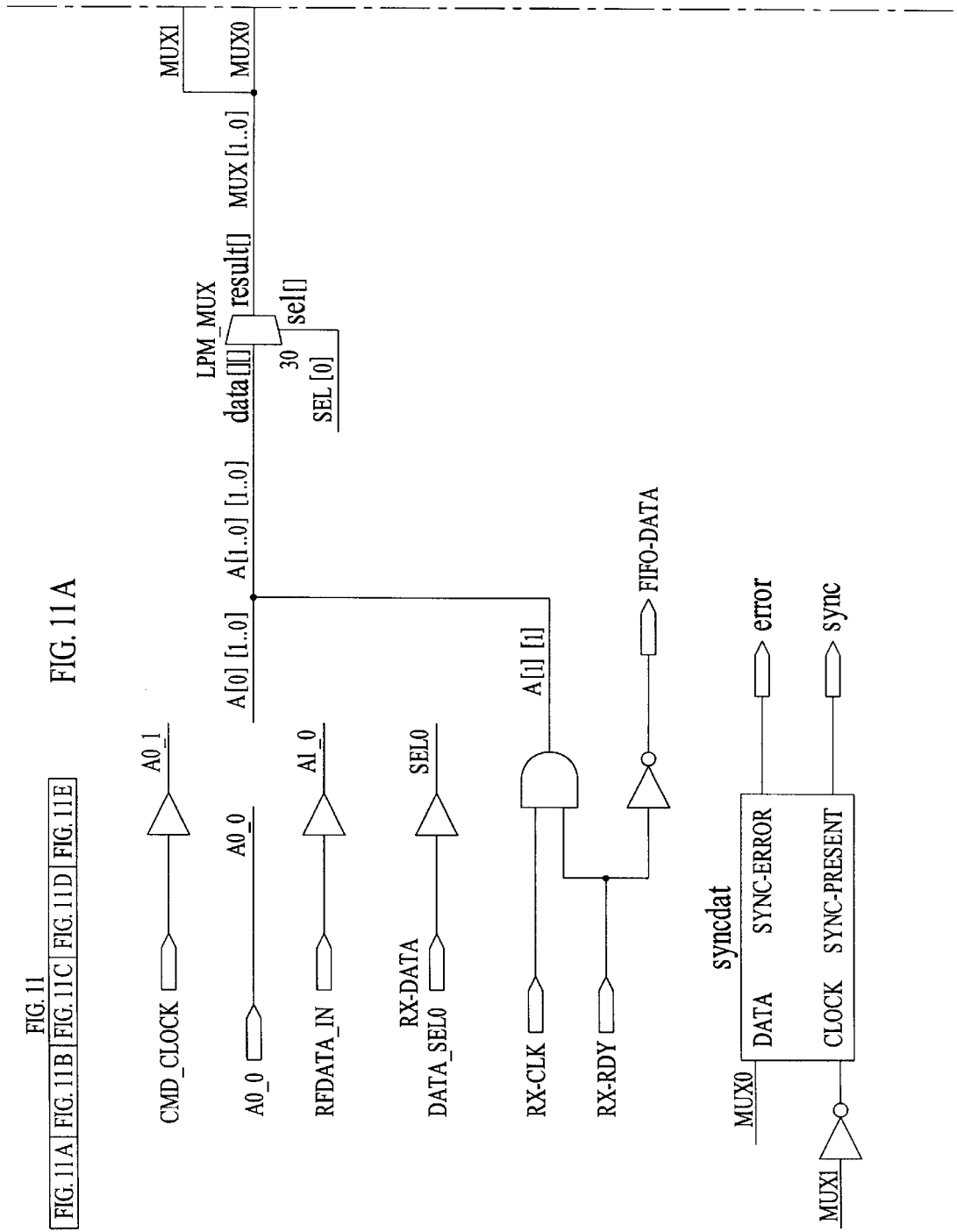

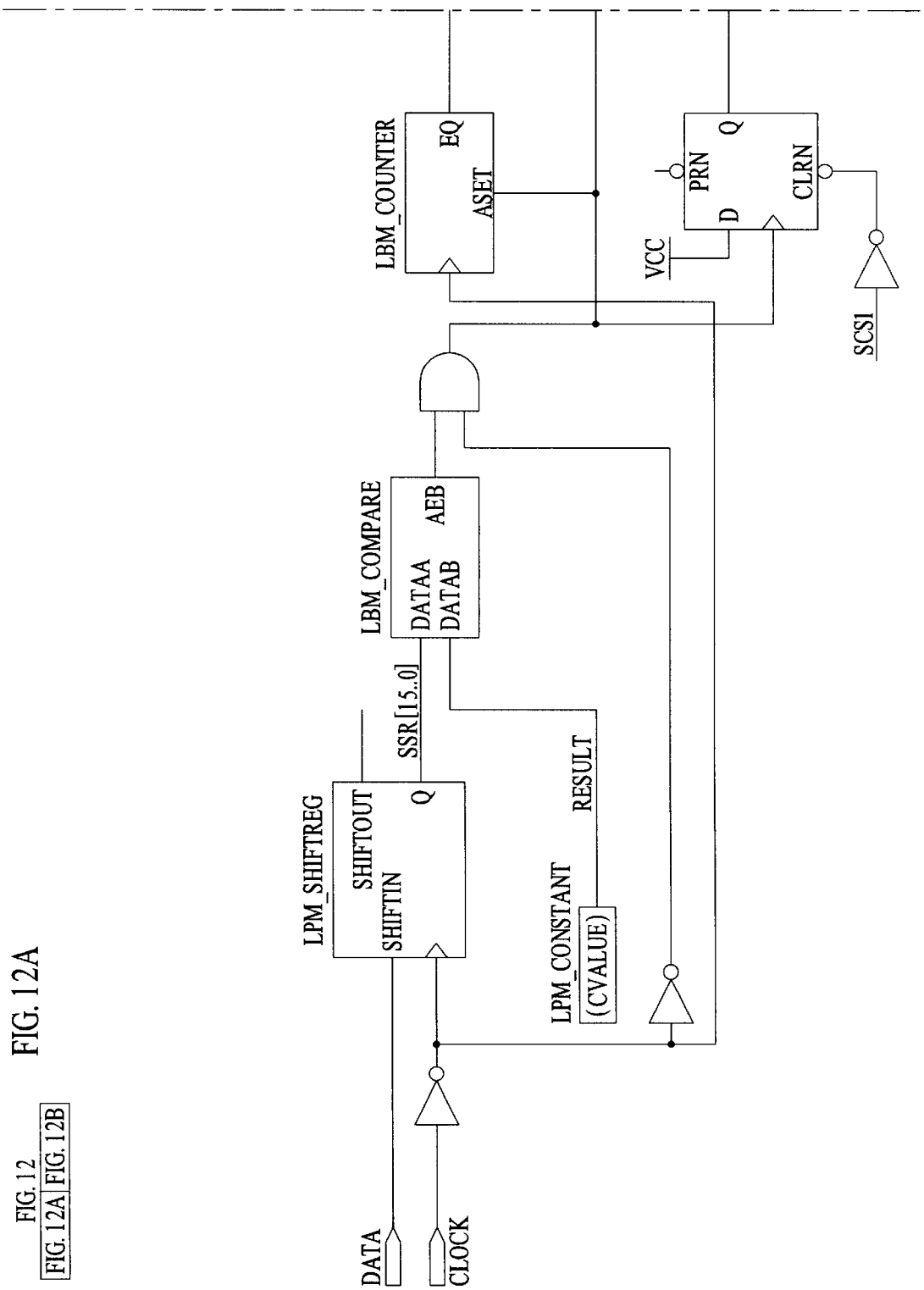

DIGITAL DATA COMMUNICATIONS SYSTEM

BACKGROUND OF THE INVENTION

The present invention generally relates to radio communications systems, and more particularly, to a digital radio communications system having a data generating node and a data receiving node. The data receiving node further provides a backlink command feature that allows the data receiving node to issue commands that may be used to alter the operating characteristics of the data generating node.

Progress in affordable wet-end sensor technology may be outstripping the concomitant data-relay capability, leaving the oceanographic and surveillance communities with instrumentation that contains inexpensive sensing capability tied to cumbersome, expensive, shore-landing trunk cables. In some circumstances, a buoyed RF data relay just outside the surf zone would mitigate much of the problem by not exposing the trunk cable to breaking surf. However, such systems have relatively high power consumption requirements and low data throughput rates. Existing data links associated with ocean-deployed sensor arrays are very large and use batteries encased in a sealed container that may reside on the sea floor. Such power supplies usually have a lifetime of less than 48 hours. Another type of data link buoy developed at the U.S. Naval Research Laboratory is capable of prolonged deployments, but relies on a diesel-driven electrical generator for power. The buoy is so large and heavy that a shipboard crane is used to deploy it. Digital data links from oceanic buoys to satellites have been used, but the data rates are typically much less than 1 Mbps.

Therefore, a need exists for a low power, high data throughput rate communications system that does not rely on cables between communications nodes that are vulnerable to damage. A further need exists for a data link that may be remotely deployed and which is compact in size and relatively light compared to present systems.

SUMMARY OF THE INVENTION

A communications node includes a controller for 1) initializing a counter and resetting a FIFO buffer; 2) determining if a predetermined number of data packets have been transmitted; 3) transmitting the data packets after the FIFO buffer is partially filled if the number of data packets transmitted is less than the predetermined number, incrementing the counter, and returning to step (2); 4) directing a transceiver to be in a receive mode if the predetermined number of data packets have been transmitted; 5) determining if a command signal has been detected; 6) processing a backlink command if a command signal has been detected, and then directing the transceiver to be in transmit mode, clearing the counter, and returning to step (2); and 7) setting the transceiver in a transmit mode if no command signal has been detected, and then clearing the counter and returning to step (2).

These and other advantages of the invention will become more apparent upon review of the accompanying drawings and specification, including the claims.

BRIEF DESCRIPTION OF THE DRAWINGS

Throughout the several view, like elements are referenced using like references.

DESCRIPTION OF THE PREFERRED EMBODIMENT

Figure 13:
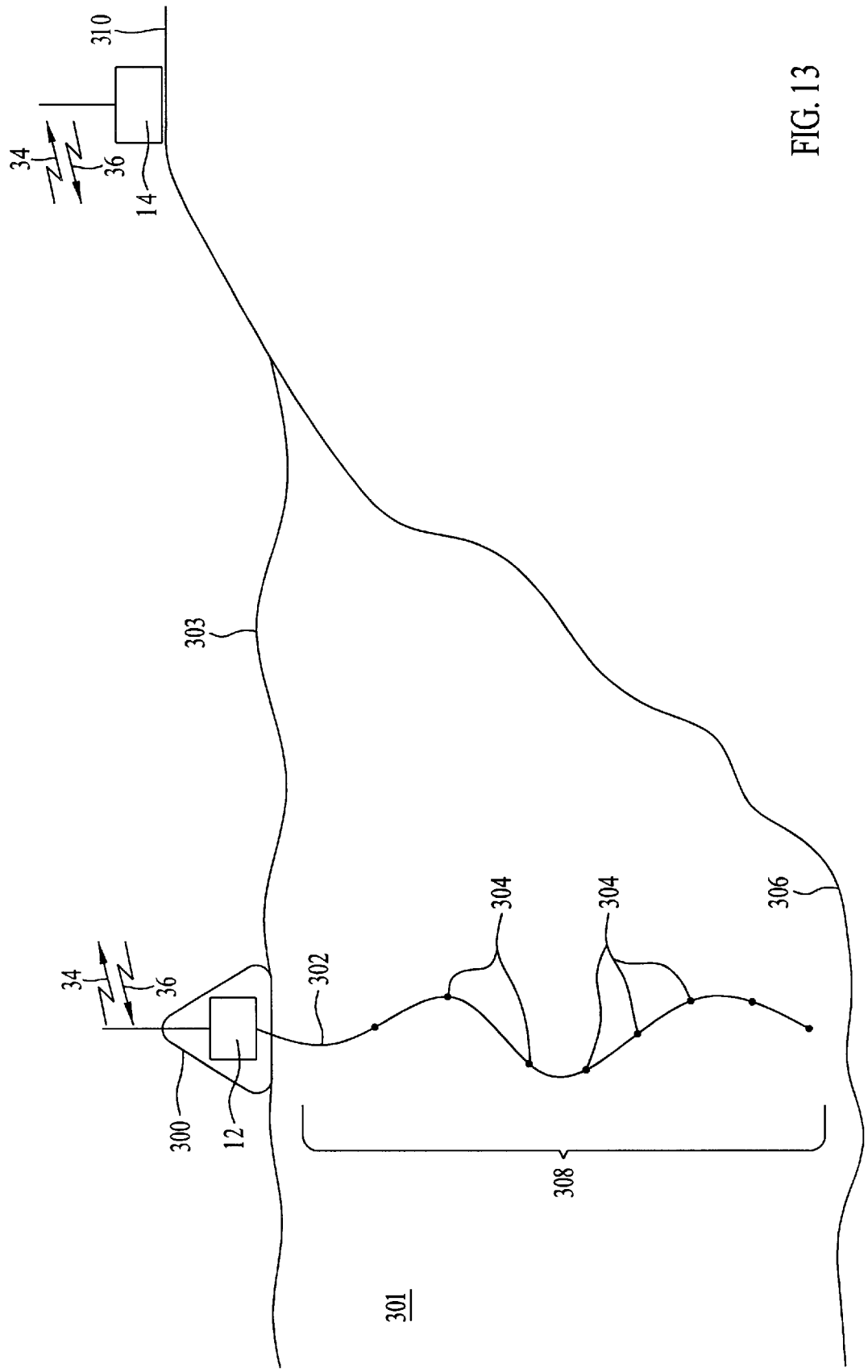
FIG. 13 depicts a digital data communications system that includes a sensor array operably coupled to the first transceiver node which is mounted in a buoy.

The present invention is directed to a low power, high data throughput communications system that is described with reference to FIG. 1. The communications system is capable of transmitting digital data at a rate up to 2 Mbps. Communications system 10 includes a first transceiver node 12 that employs a controller, temporary data storage device 24 such as a FIFO buffer, transceiver 28, and antenna 32. Controller 20 receives data 18 from a data source 16 such as a sensor array, described and shown further herein, and generates a data storage command via signal line 22 that is directed to temporary data storage device 24 whereupon the temporary data storage device 24 stores the data. Controller 20 generates a control signal that is conducted via signal line 26 to transceiver 28 and directs the transceiver to alternately switch between a transmit mode for transmitting the digital data stored in temporary data storage device 24, and a receive mode for detecting messages such as radio frequency message 36, generated by a second transceiver node 14. Controller 20 also generates a control signal that is presented on signal line 26 that commands transceiver 28 to remain in a receive mode when message 36 is a command message. Transceiver node 12 may be mounted in a buoy, as shown in FIG. 13 so that data generated by a remotely located sensor array interconnected to first transceiver node 12 may be provided to second transceiver station 14 which maybe located on shore without the need for an interconnecting cable.

Figure 1:
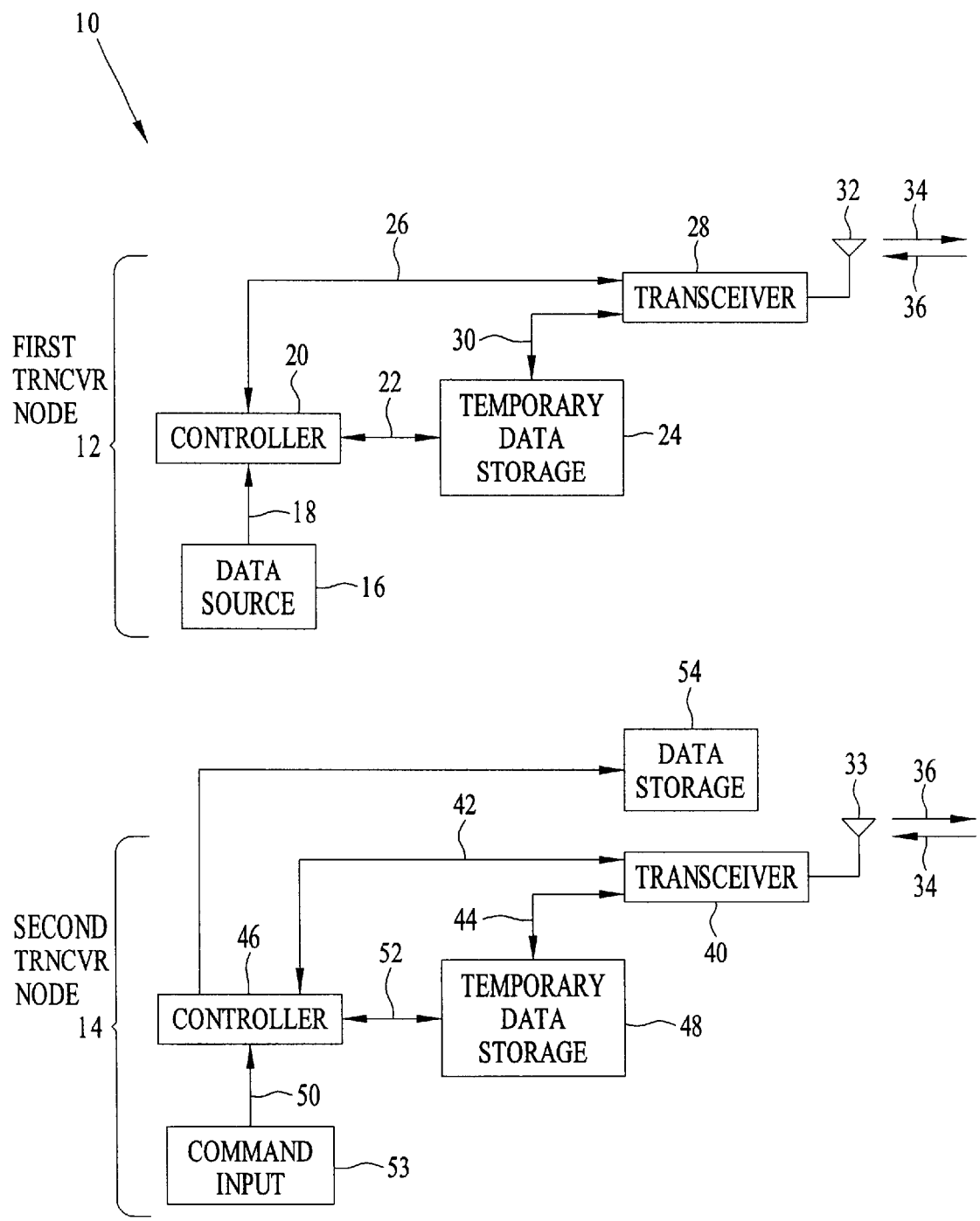
FIG. 1 is a block diagram of a low power, high data throughput communications system embodying various features of the present invention.

Still referring to FIG. 1, second transceiver node 14 may receive input commands 50 from a human operator through input device 53 such as a keyboard or manually operated switch. The commands are provided via signal line 50 to a controller 46 that directs temporary data storage device 48, such as a FIFO buffer to store commands 50. Controller also provides control signals via signal line 42 to a transceiver 40 that radiates an RF output signal 36 through an antenna 33. Control signals 40 establish the operating parameters and direct the operation of transceiver 40. Upon receipt of an appropriate command, transceiver 40 reads digital data stored in data storage unit 48 and transmits the digital data in the form of signal 36, which may be a radio frequency signal that is intended to be detected by antenna 32 and received by transceiver 28. Transceiver 40 may operate in a receiver standby mode under the control of controller 46 via signal line 42 to detect radio frequency (RF) signal 34 generated by transceiver 28. Data encoded in signal 34 and received by transceiver 40 is stored in data storage unit 48 working under the supervision of controller 46 via signal line 52. Controller 46 may provide a control signal to temporary data storage device 48 so that data from the storage device is directed through controller 46 via signal line 56 to be stored in memory device 54 such as a hard drive, CD ROM disk, or the like.

Figure 6B:
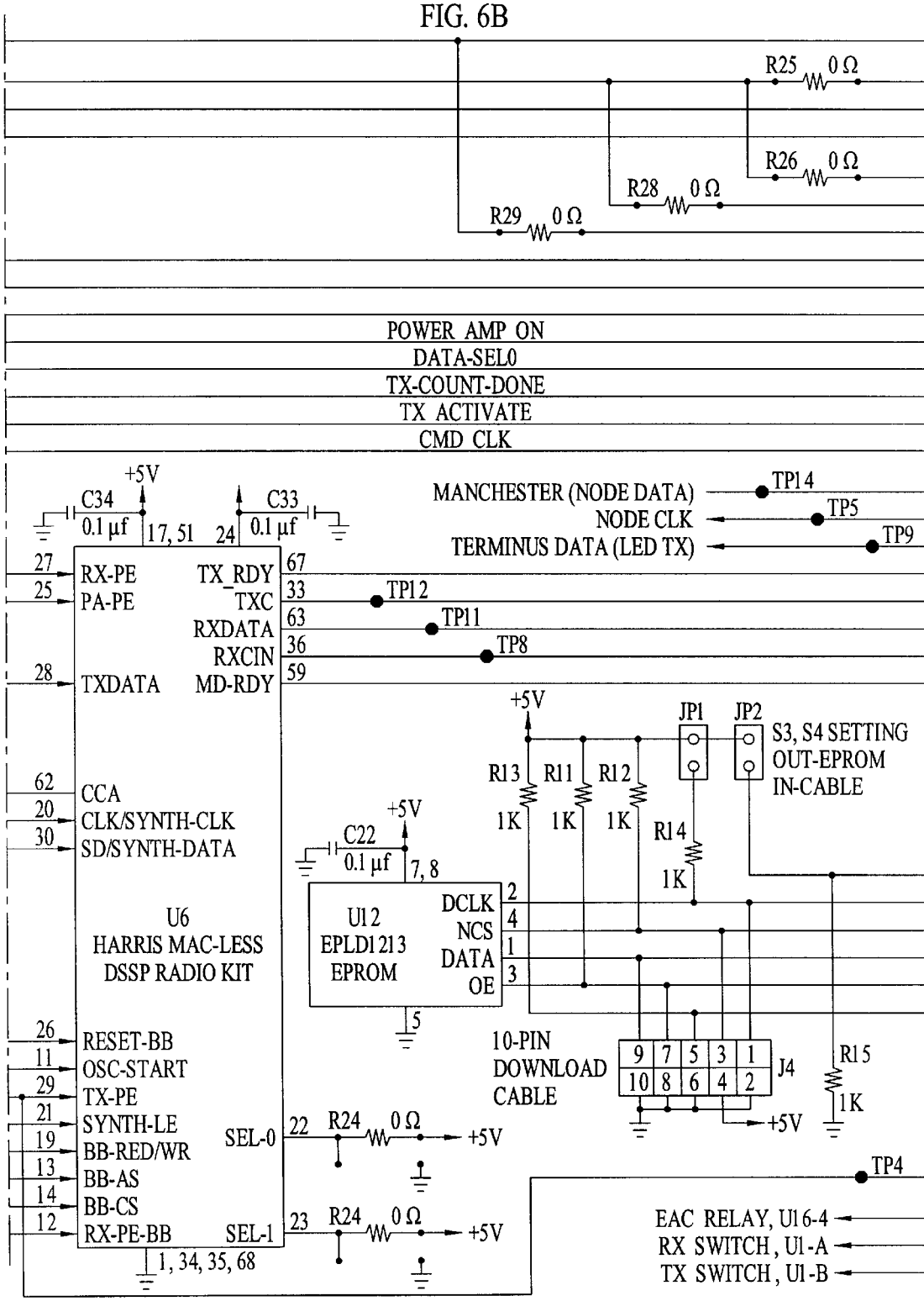
FIGS. 6 (references to FIG. 6 herein refer collectively to FIGS. 6A, 6B, 6C, and 6C) and 7 (references to FIG. 7 refer collectively to FIGS. 7A and 7B) are examples of schematic diagrams for implementing controller 60 and transceiver 64 of the first transceiver node represented in FIG. 2.
Figure 6C:
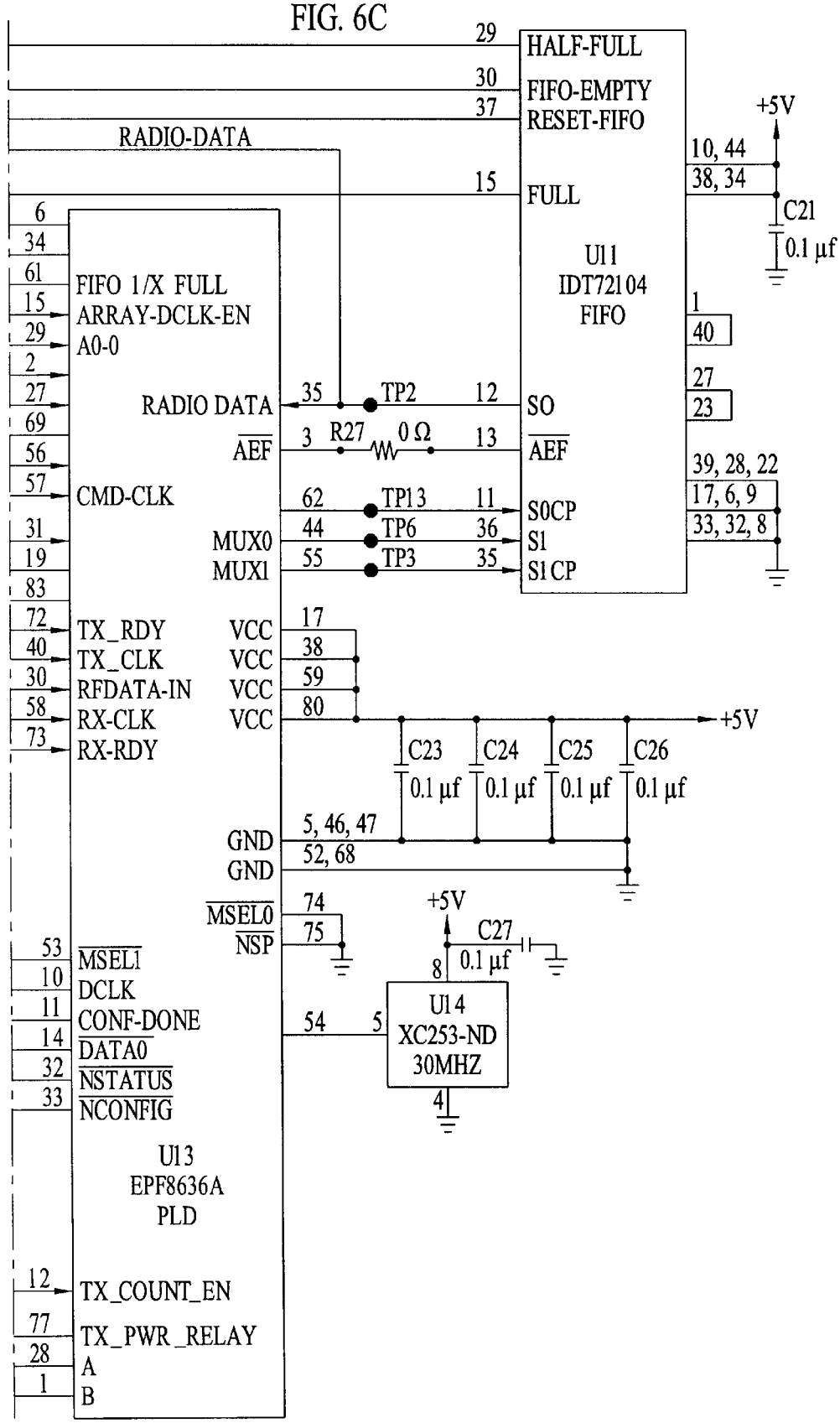
Figures 7, 7A:
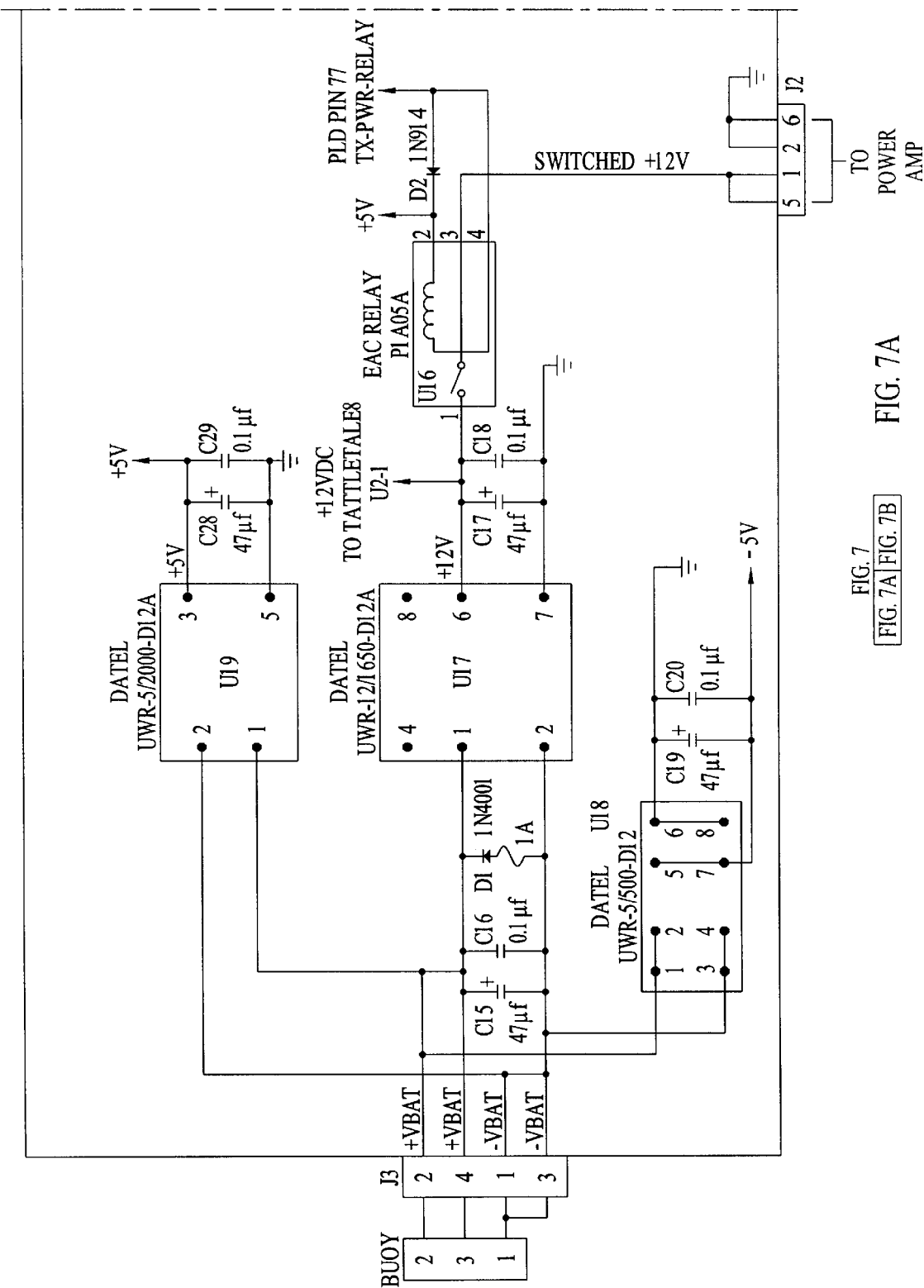
Figure 7B:
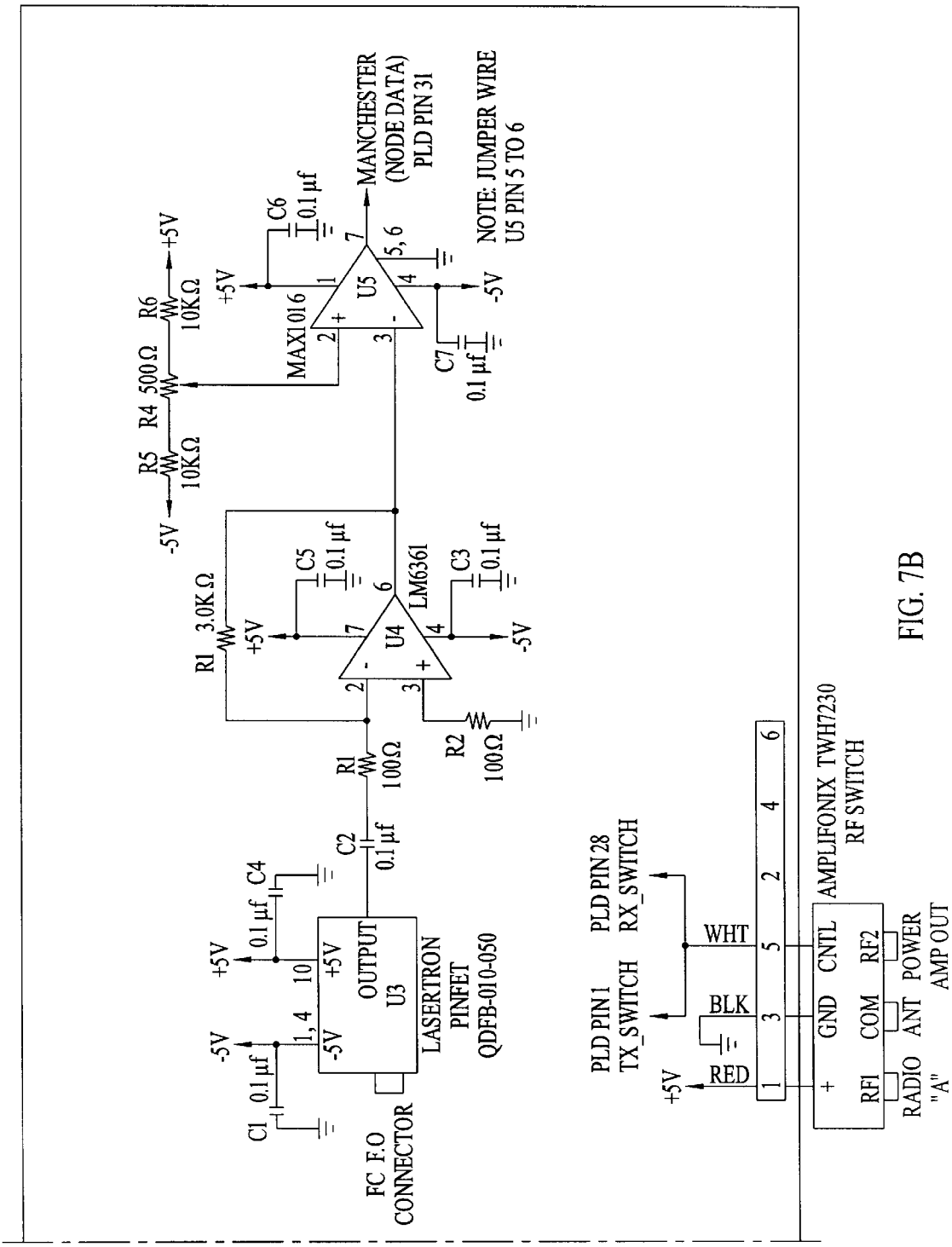
Figure 12B:
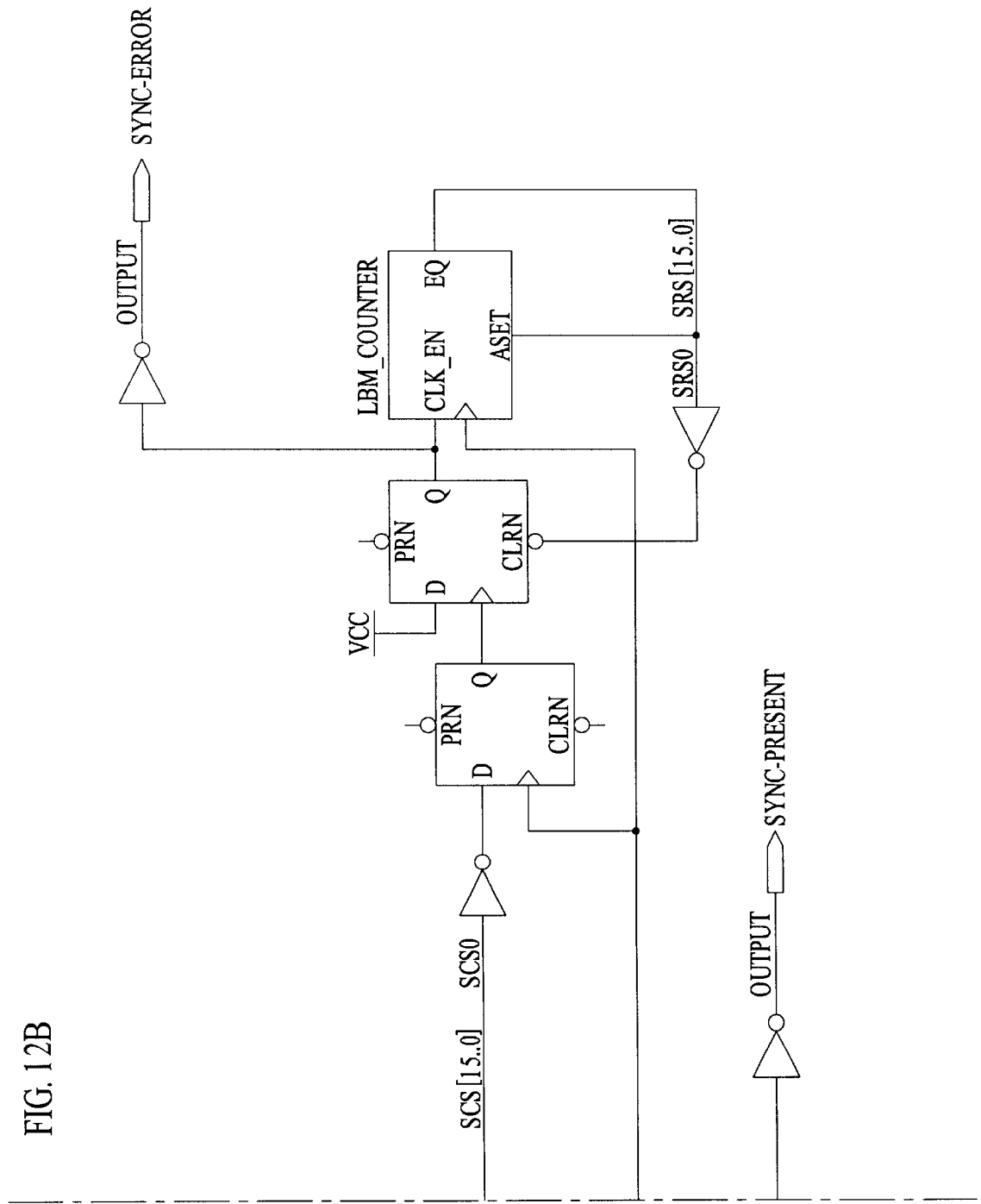
FIG. 12 (references to FIG. 12 herein refer collectively to FIGS. 12A and 12B) is an example a circuit diagram for implementing the synch detector (syncdet) for controllers 62 and 126.

An example of one implementation of first transceiver node 12 is described with reference to the block diagram and flow chart presented in FIGS. 2 and 3, respectively. Controller 20 may include a first controller 60 such as an Onset Computer Tattletale Model 8, which is a Motorola 68332 based, low power embedded computer board, and a second controller 62, such as an Altera EPF8282 programmable logic device which controls high speed data functions that cannot be processed by the Tattletale. Software programming instructions suitable for effectuating the functions of controller 60 are presented in APPENDIX 1 by way of example and are written in the C programming language. Temporary storage device 24 is preferably implemented as a FIFO memory device; and transceiver 64 may be a Harris PRISM radio chipset which provides an RF to digital interface that sends and receives data in packets, and generates and processes its own header information which precedes each packet. The Harris transceiver is preferably configured to transmit an internally generated header using DBPSK format at 1 Mbps, and transmit data using DQPSK at 2 Mbps. Examples of circuit diagrams showing the interconnections of controller 60 and transceiver 64 are presented by way of example in FIGS. 6 and 7. Power supply 65 provides electrical power signal 67 to controllers 60 and 62, FIFO 24, amplifier 66, and transceiver 64. The efficiency of first transceiver node 12 is such that it may satisfy all functional requirements even in applications where power supply 65 generates electrical power signal 67 at a rate that, for example, does not exceed 9W. An example of a schematic diagram for implementing controller 62 is presented in FIG. 10. FIG. 12 is a schematic representation of the sync detector (syncdet) shown in FIG. 10.

Figure 2:
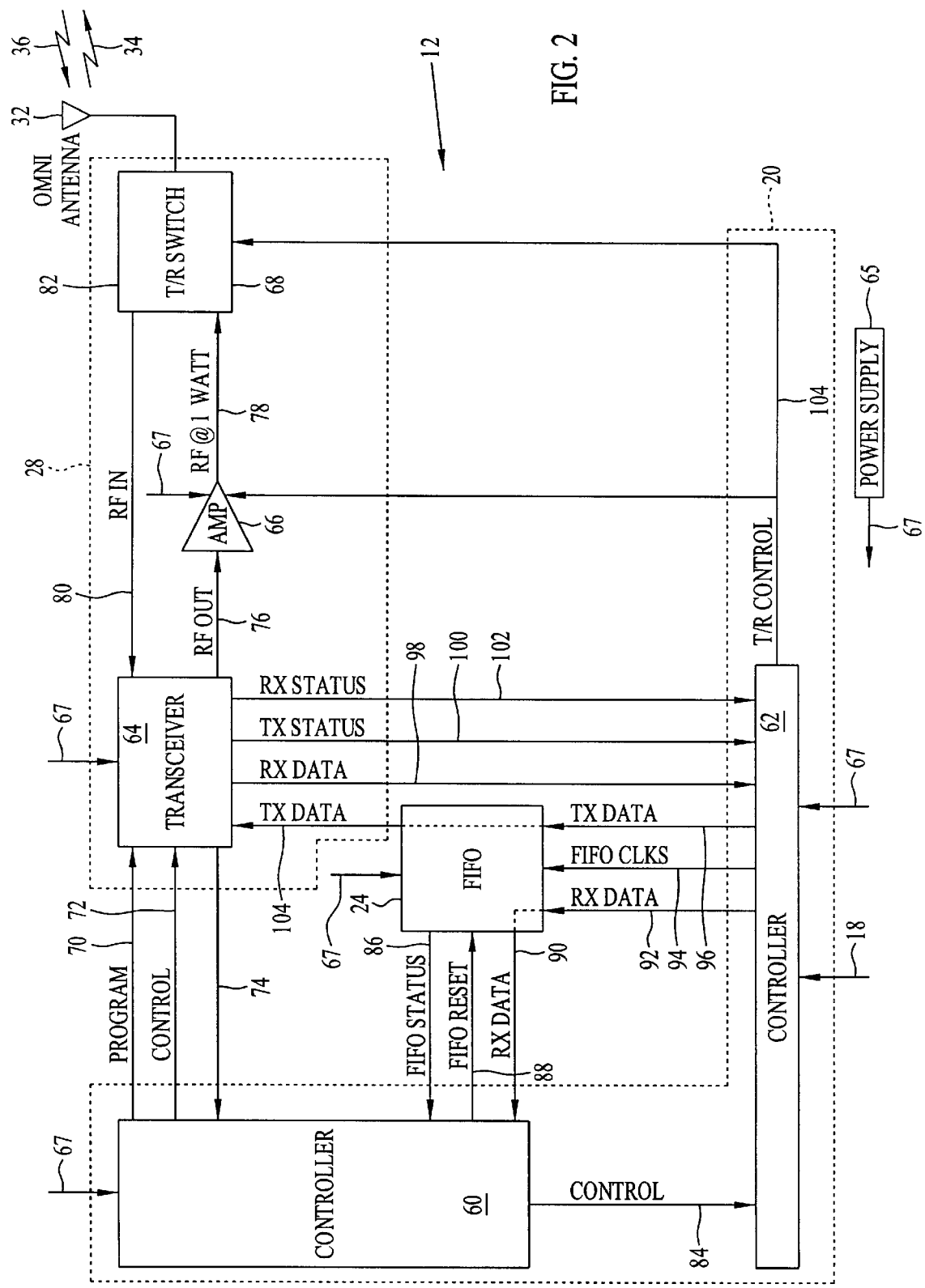
FIG. 2 is a block diagram of an example of the first transceiver node.
Figure 3:
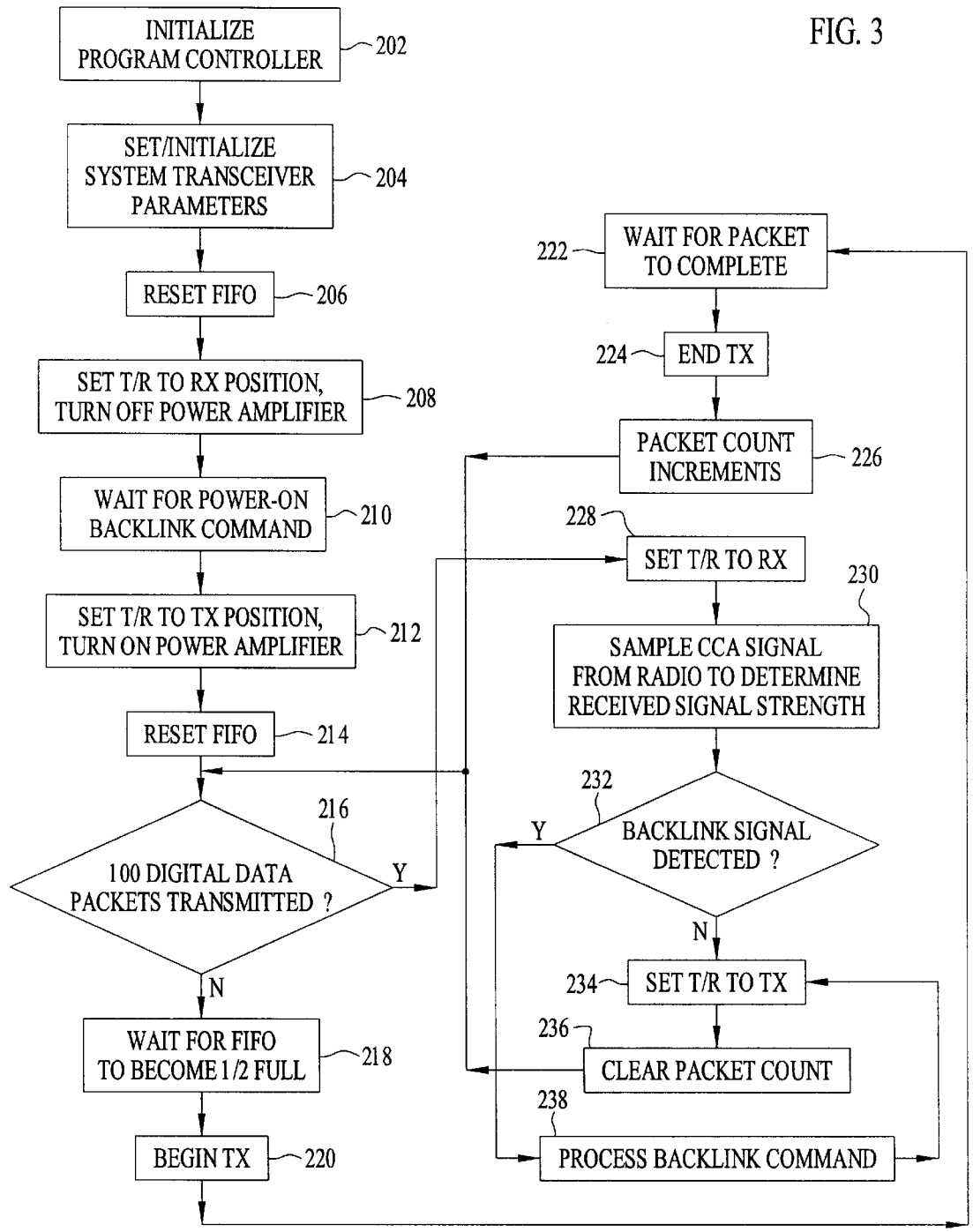
FIG. 3 is a flow chart exemplifying the operation of the first transceiver node depicted in FIG. 2.

Referring to FIGS. 2 and 3, at step 202, controller 60 is initialized by turning on its power i whereupon it runs through a self-initialization process. At step 204, controller 60 generates output signals 70 to initialize transceiver 64 to the desired operating mode via signal line 72 and to initialize an internal counter. Controller 60 also initiates internal clocks and an oscillator in transceiver 64. In the preferred embodiment, transceiver 64 is configured to transmit in a direct sequence, spread-spectrum mode. At step 206, controller 60 resets FIFO 24 by purging its contents with a reset command via signal line 88. The advantage of using a direct-sequence, spread-spectrum mode of transmission is that interference with unwanted signals is greatly reduced, and allows multiple transceiver nodes 12 transmitting in the same frequency range to operate simultaneously in a localized region without incurring significant interference.

Continuing at step 208, controller 60 provides control signal 84 to controller 62 that, in turn, emits a T/R (transmit/receive) control signal 104 to: a) disable amplifier 66; and b) set T/R switch 82 to a receive (Rx) position so that the receiver component of transceiver 64 may look for backlink messages encoded in RF signal 36 for a predetermined time.

Figure 4:
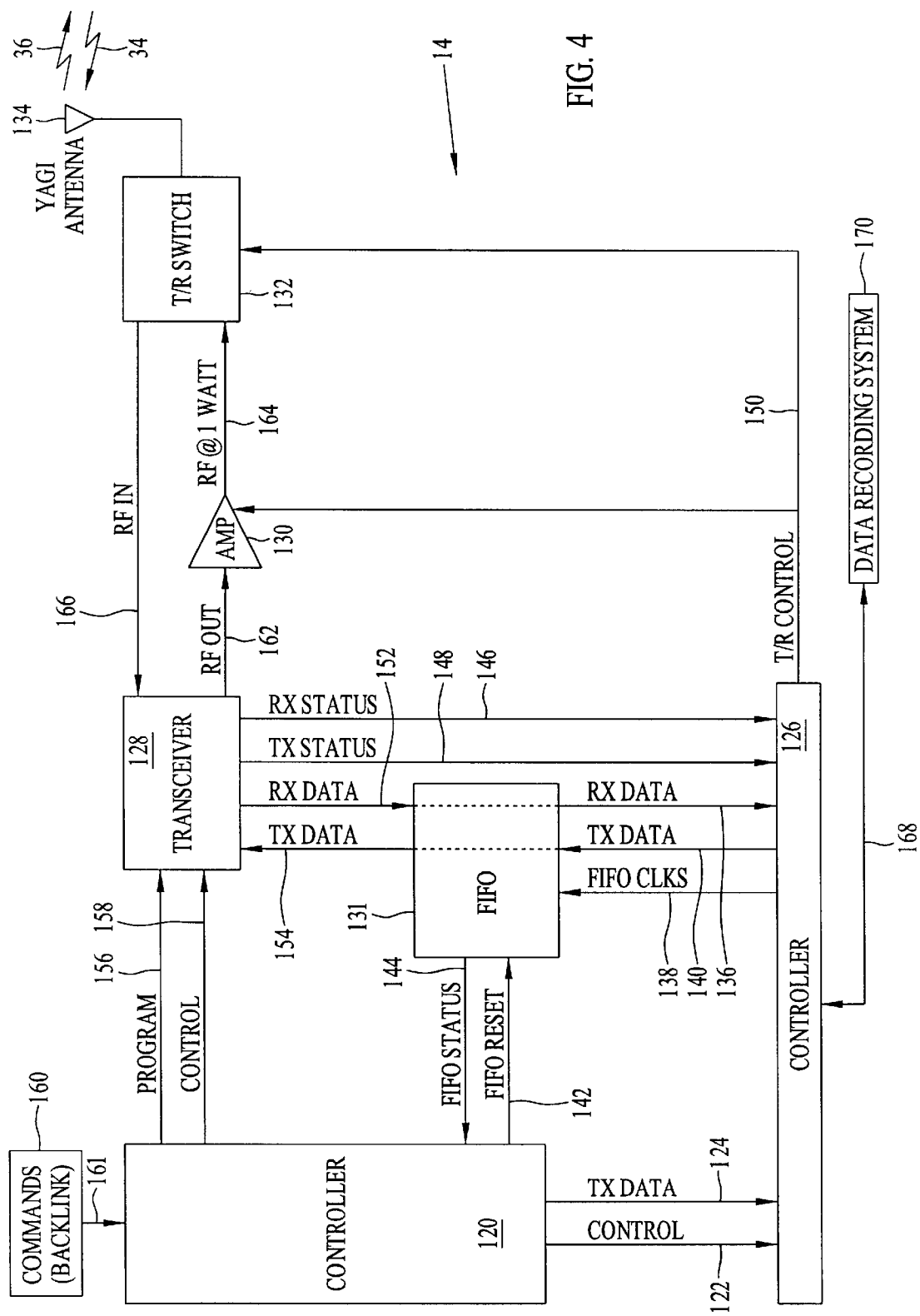
FIG. 4 is a block diagram of an example of the second transceiver node.

Continuing to step 210, transceiver 64 of the first transceiver node 12 is now in a stand-by receiver mode, waiting for a power-on command from transceiver 128 from second transceiver node 14, as shown in FIG. 4. Received data 80 that is transformed from RF signal 36 by antenna 32 is provided as Rx data 98 from transceiver 64 via signal line 100 to controller 62. Then controller 62 deciphers words encoded in received data 98 and transfers decoded (Rx) data via signal line 92 to FIFO 24 which buffers the data. All operations of FIFO 24 are synchronized by FIFO clock signals generated by controller 62 that are presented to FIFO 24 via signal line 94. The received data then is provided to controller 60 via signal line 90. Controller 60 determines what to do with the backlink command word encoded in RF signal 36 and input as $RF_{in}$ on signal line 80 into transceiver 64. If the backlink command is a "transmitter turn-on" command, controller 60 sends out a control signal via line 84 to controller 62. Then controller 62 sets T/R (transmit/receive) switch 82 (single pole, double throw switch) via signal line 104 and enables transmitter amplifier 66. Transmitter amplifier 66 is now ready to amplify the transmission output signals $Rf_{out}$ generated by the transmitter of transceiver 64. At this stage, the transmitter is in a transmit mode, but no data is being transmitted.

System 12 continues to step 214 where controller 60 generates a FIFO Reset signal 88 that is provided to FIFO 24 and directs the FIFO to clear all data. At step 216, controller 60 determines if the packet count PC internally generated in controller 60 equals a predetermined, preferably positive integral number N, as for example, 100. If PC=N, the system proceeds to step 228. If PC≠N, then system 12 continues to step 218.

At step 228, controller 60 generates a control signal that is provided to controller 62 via signal line 84 causing controller 62 to initiate T/R control signal 104 that disables transmitter amplifier 66 and sets T/R switch 68 to the receive position so that the receiver of transceiver 64 may listen for backlink command signals encoded in $RF_{in}$ signal 36. At step 230, controller 60 checks the energy level on signal line 74. At step 232, controller 60 determines if the energy level on signal line 74 is sufficient to indicate the presence of a backlink signal. If the determination at step 232 is NO, that is, no backlink command is detected, system 12 proceeds to step 234. If the determination at step 232 is YES, a backlink signal is detected and system 12 proceeds to step 238.

At step 234, controller 60 generates a control signal that is provided via signal line 84 and directs controller 62 to initiate a T/R control signal that is provided on signal line 104 and which enables transmitter amplifier 66 and sets T/R switch 68 to the transmit position. From step 234, system 12 continues to step 236 where controller 60 reinitializes the packet counter, whereupon system 12 returns to step 216.

If at step 232, controller 60 determines that a backlink command has been detected, then, the received data encoded in the Rx Data signal is provided from the receiver of transceiver 64 via signal line 98 to controller 62. The receiver of transceiver 64 transforms the $RF_{in}$ signal 80 into the Rx Data signal that is output on signal line 98 and directed to controller 62. Controller 62 deciphers words encoded in the Rx Data signal and transfers decoded digital data as Rx Data signal via signal line 92 to FIFO 24, which buffers the decoded data. The Rx Data then is transferred from FIFO 24 to controller 60 via signal line 90. Controller 60 processes the particular Rx Data received from FIFO 24 that corresponds to the detected backlink command to determine what type of instruction, if any, is to be implemented. The system then continues to step 234.

As stated above, if the determination at step 216 is a NO, then system 12 continues to step 218 where controller 60 monitors a FIFO status flag presented on signal line 86 while waiting until FIFO 24 is partially full, as for example, half-full. Then, at step 220, controller 60 generates a transmit control signal via signal line 72 that directs the transmitter of transceiver 64 to transmit the data packets stored in FIFO 24 to transceiver 64 via signal line 104 until the FIFO status flag on signal line 86 indicates to controller 60 that FIFO 24 is empty. Continuing from step 222 to step 224, controller 60 issues a control signal via signal line 72 that directs the transmitter of transceiver 64 receiver to stop transmitting data, whereupon the transmitter remains in transmit mode. Next, at step 226 controller 60 increments the packet counter. The system then proceeds to step 216, described above.

Figure 5:
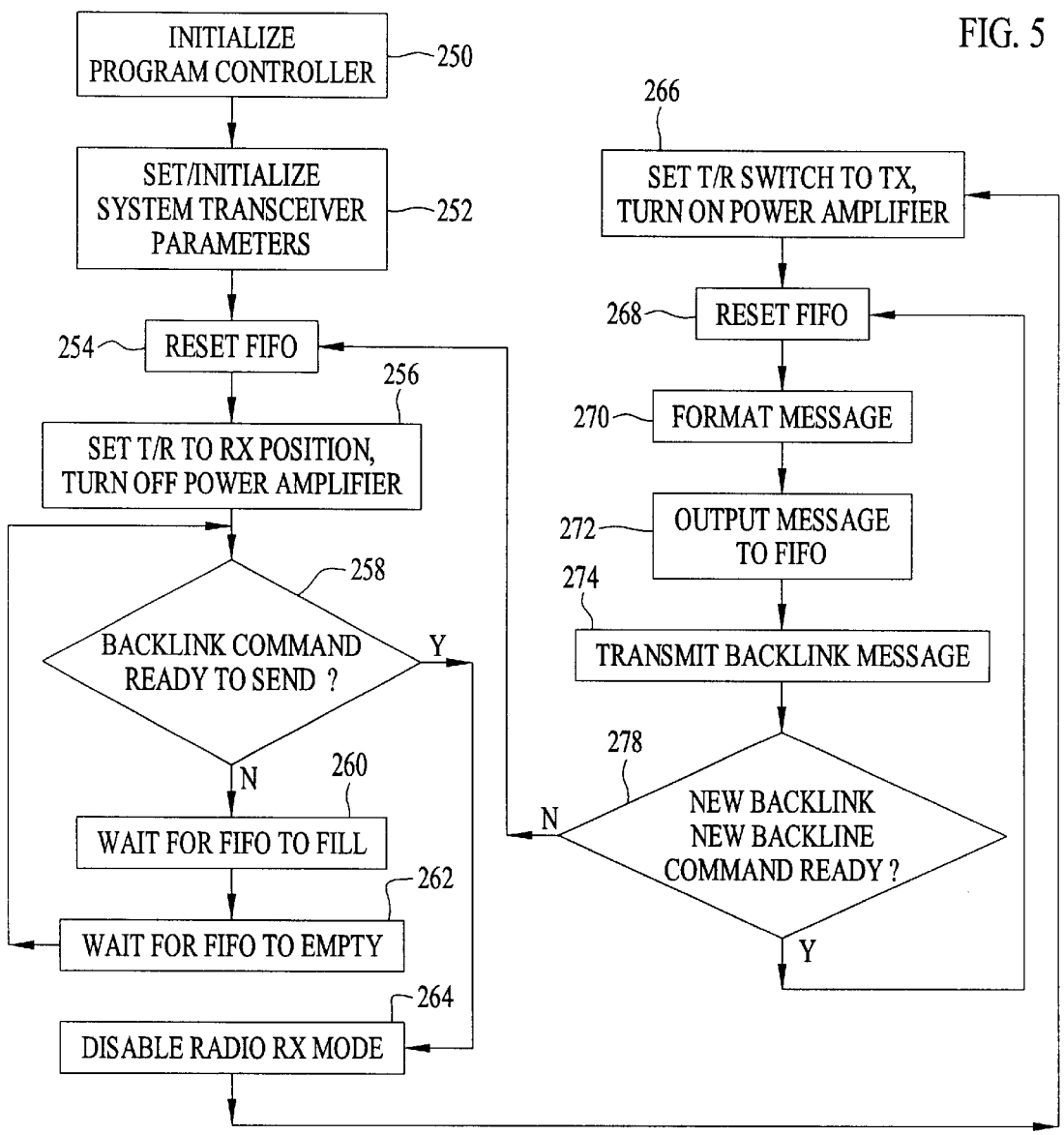
FIG. 5 is a flow chart exemplifying the operation of the second transceiver node depicted in FIG. 4.
Figure 8A:
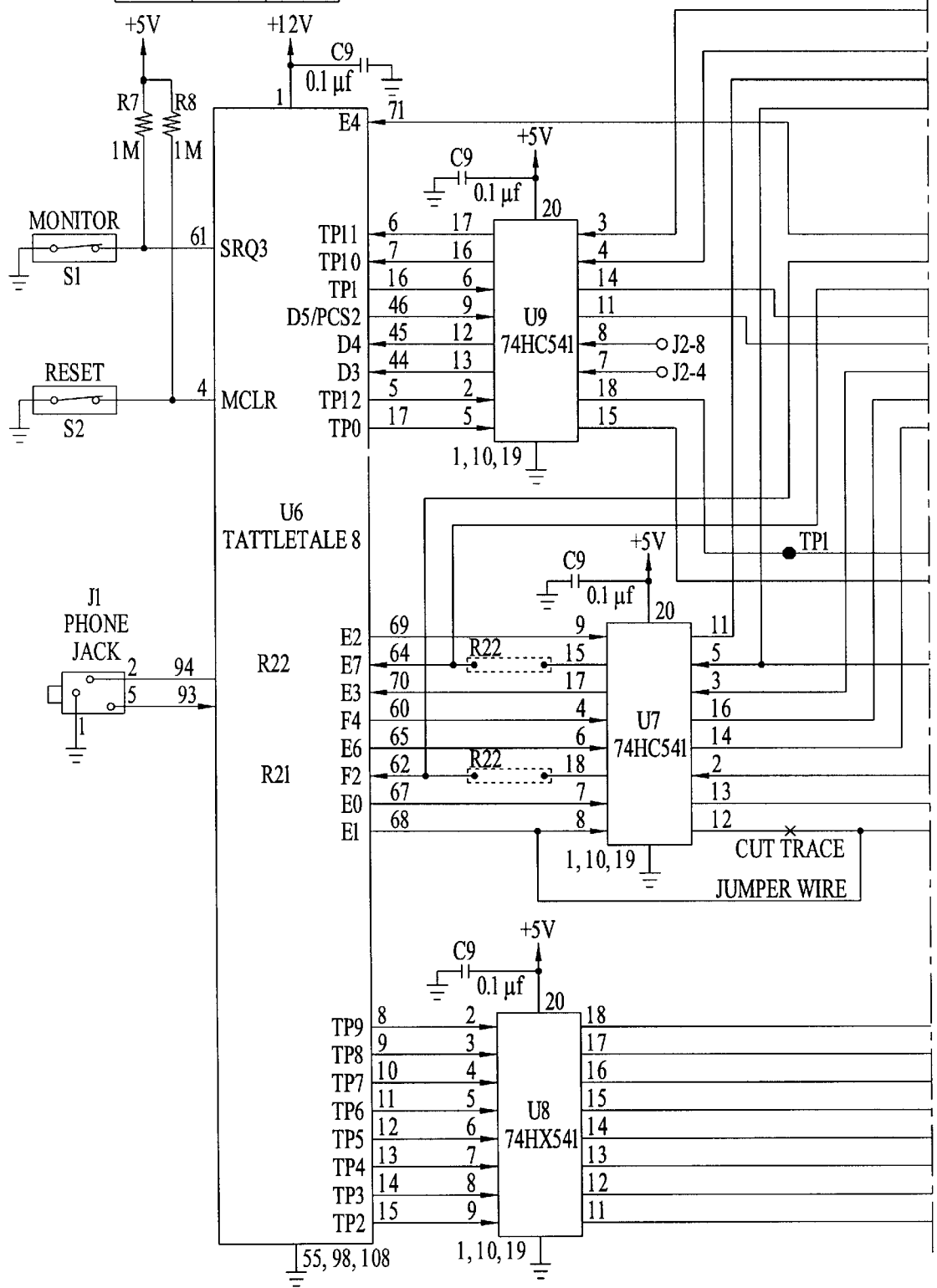
FIGS. 8 (references to FIG. 8 herein refer collectively to FIGS. 8A, 8B, and 8C) and 9 are examples of schematic diagrams for implementing controller 120 and transceiver 128 of the second transceiver node represented in FIG. 4.
Figure 8B:
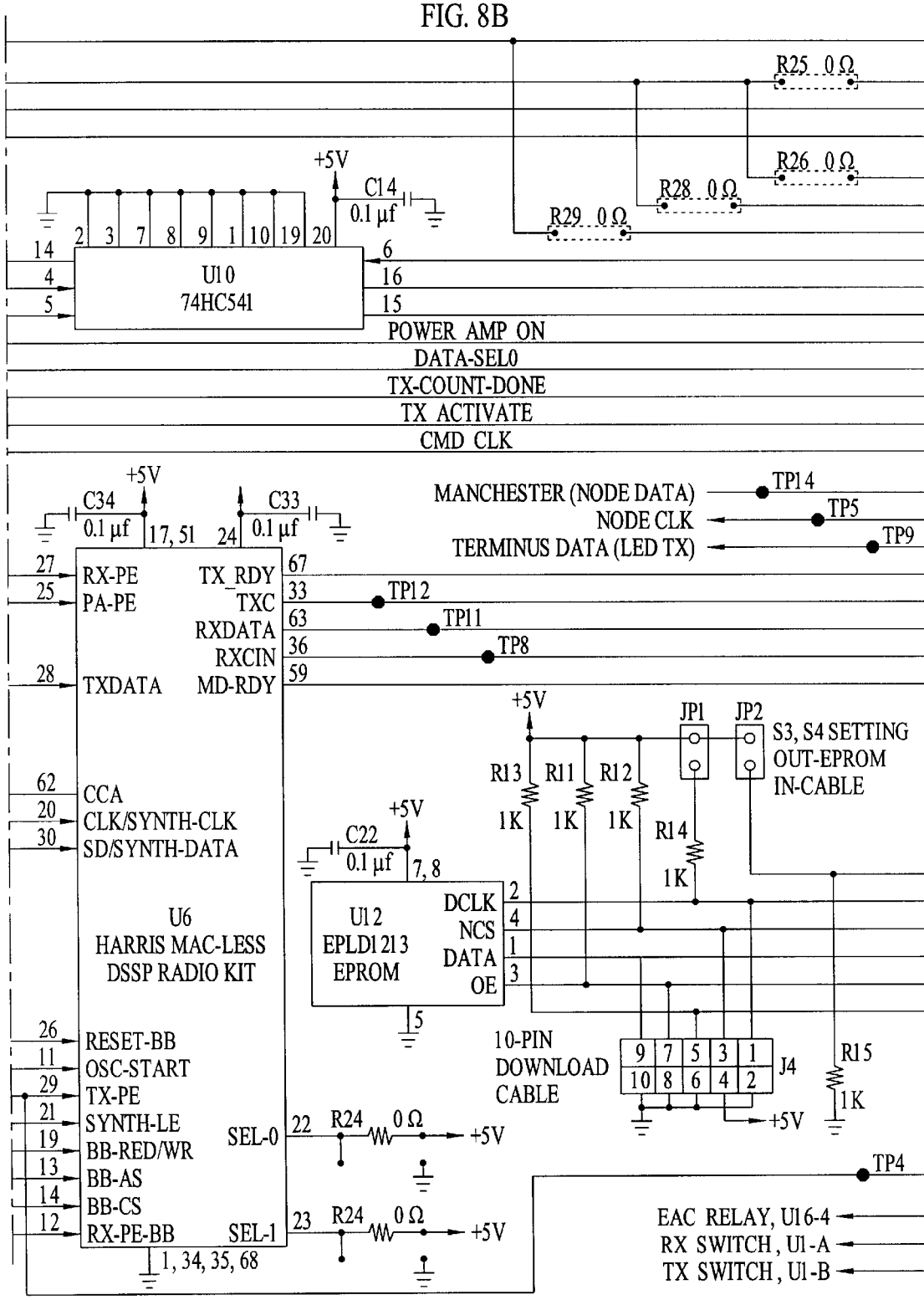
Figure 8C:
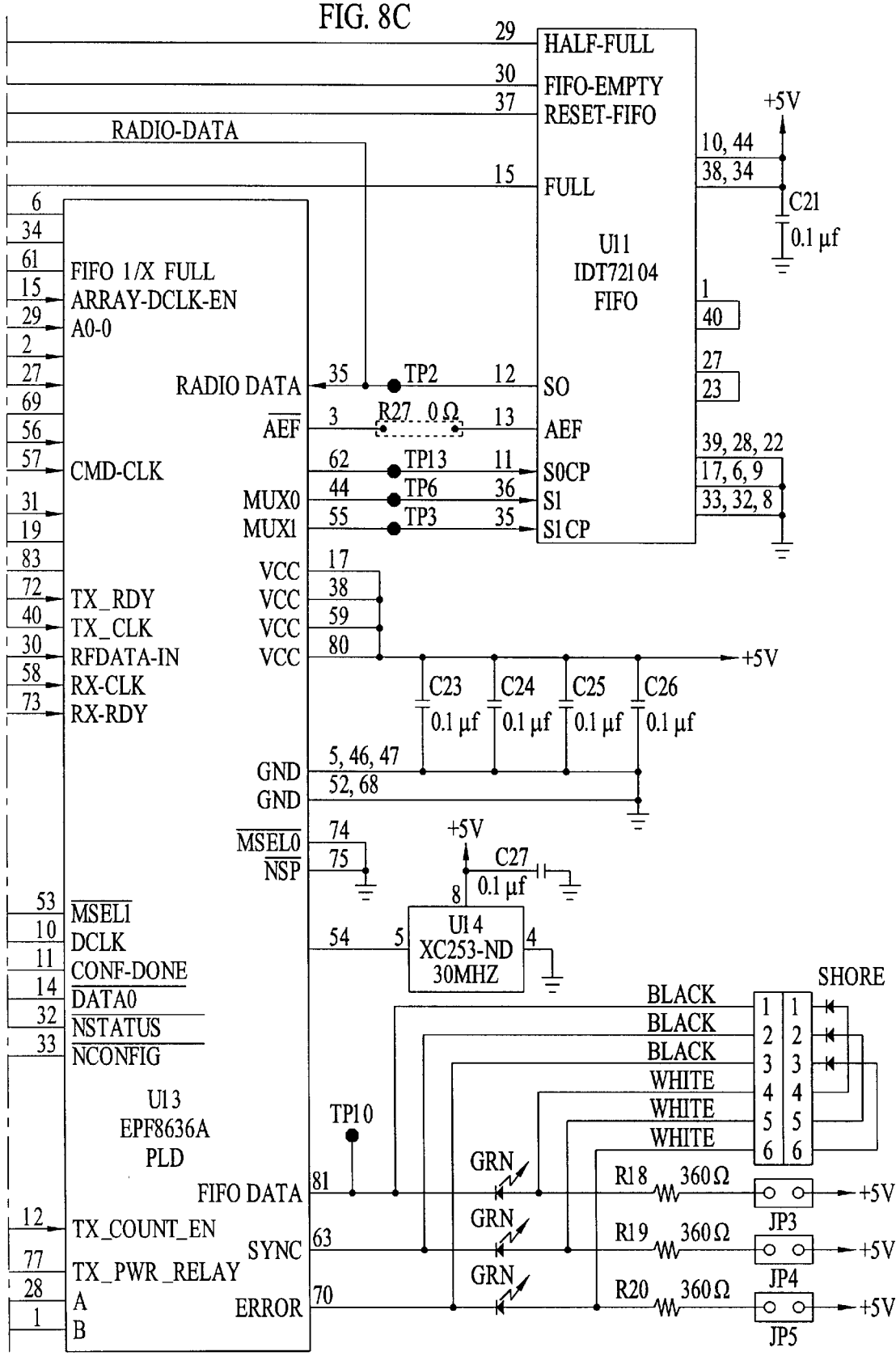
Figure 9:
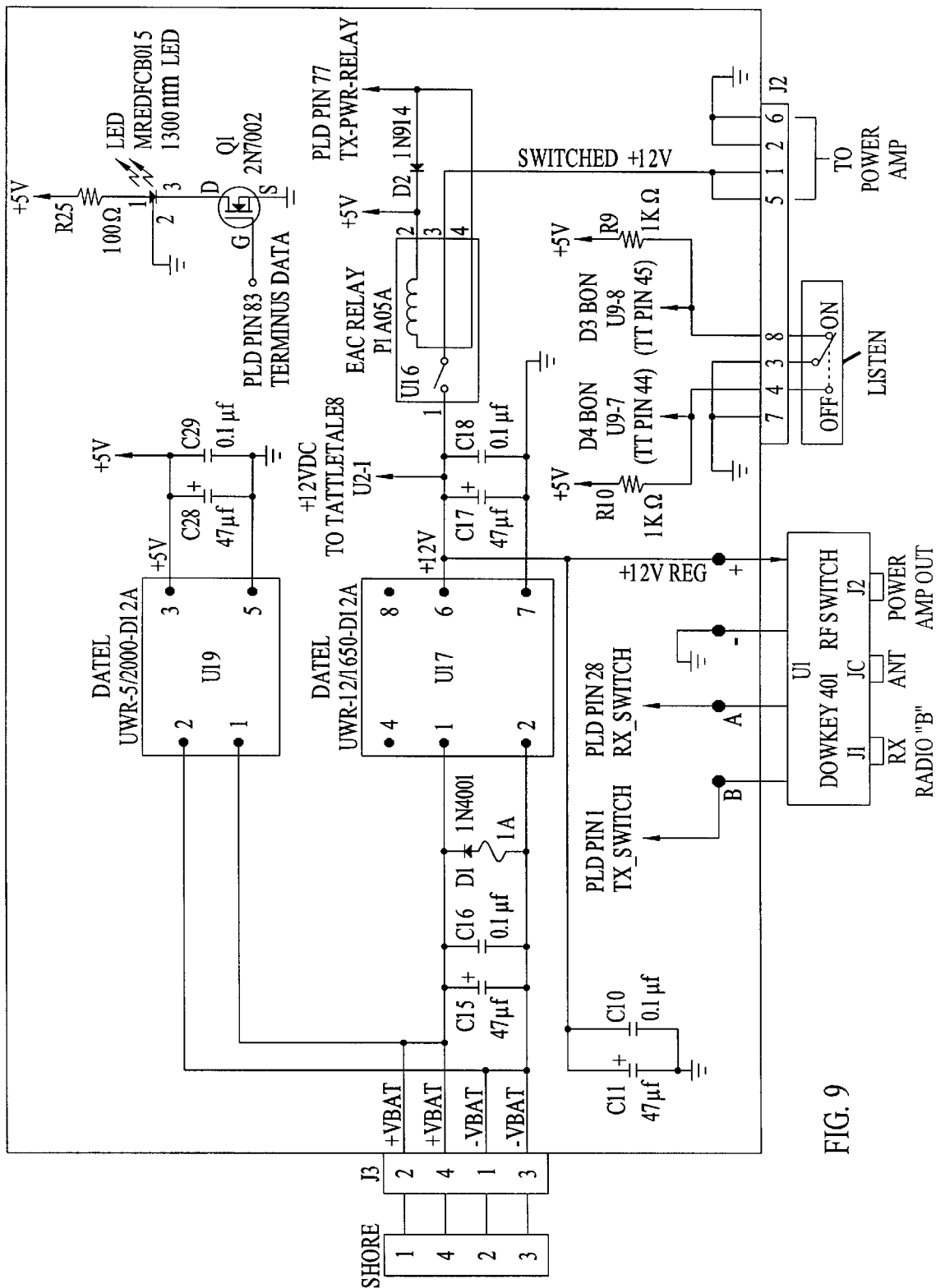
Figure 10B:
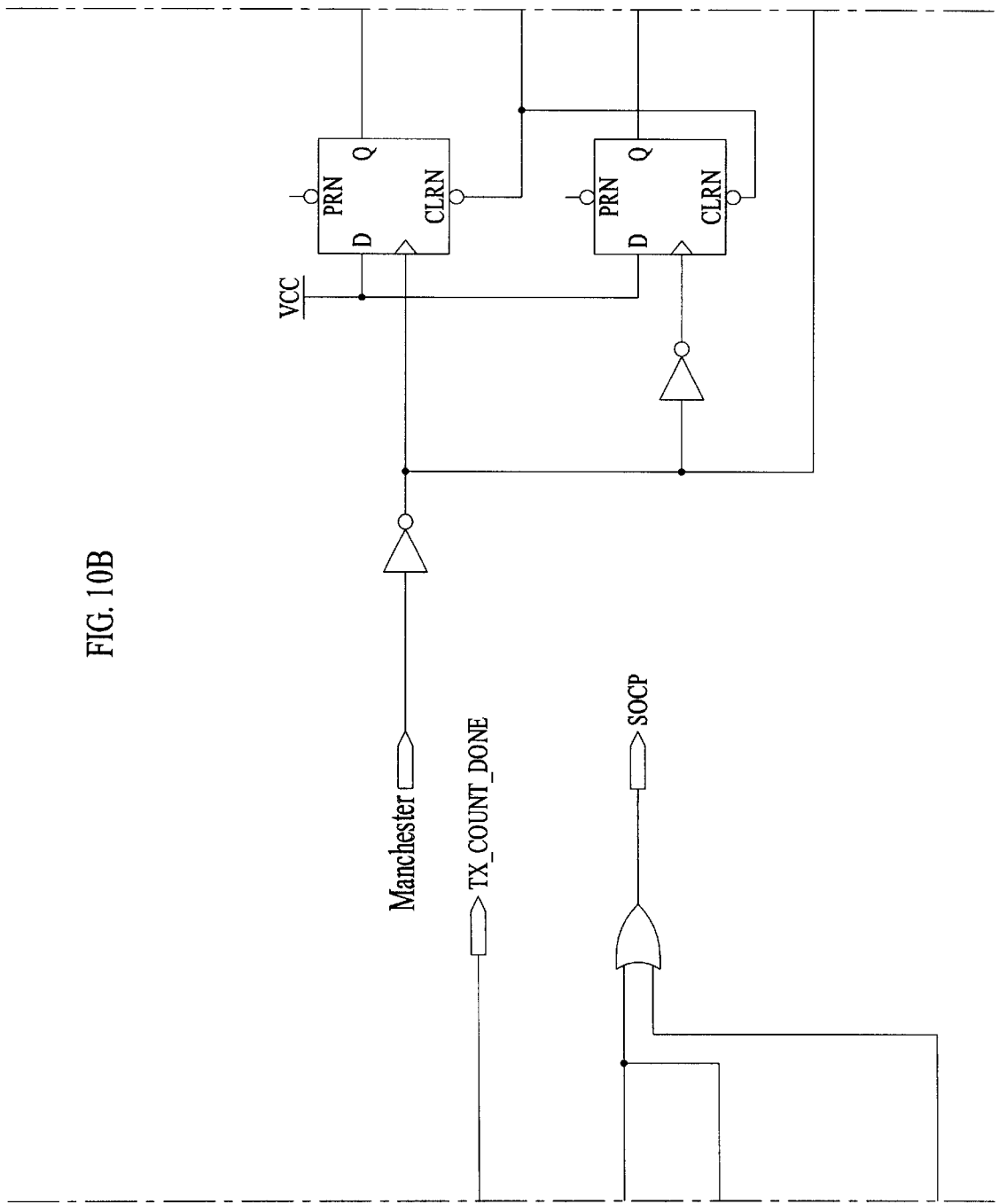
FIG. 10 (references to FIG. 10 herein refer collectively to FIGS. 10A, 10B, 10C, 10D and 10E) example of a circuit diagram for implementing controller 62 of the first transceiver node represented in FIG. 2.
Figure 10C:
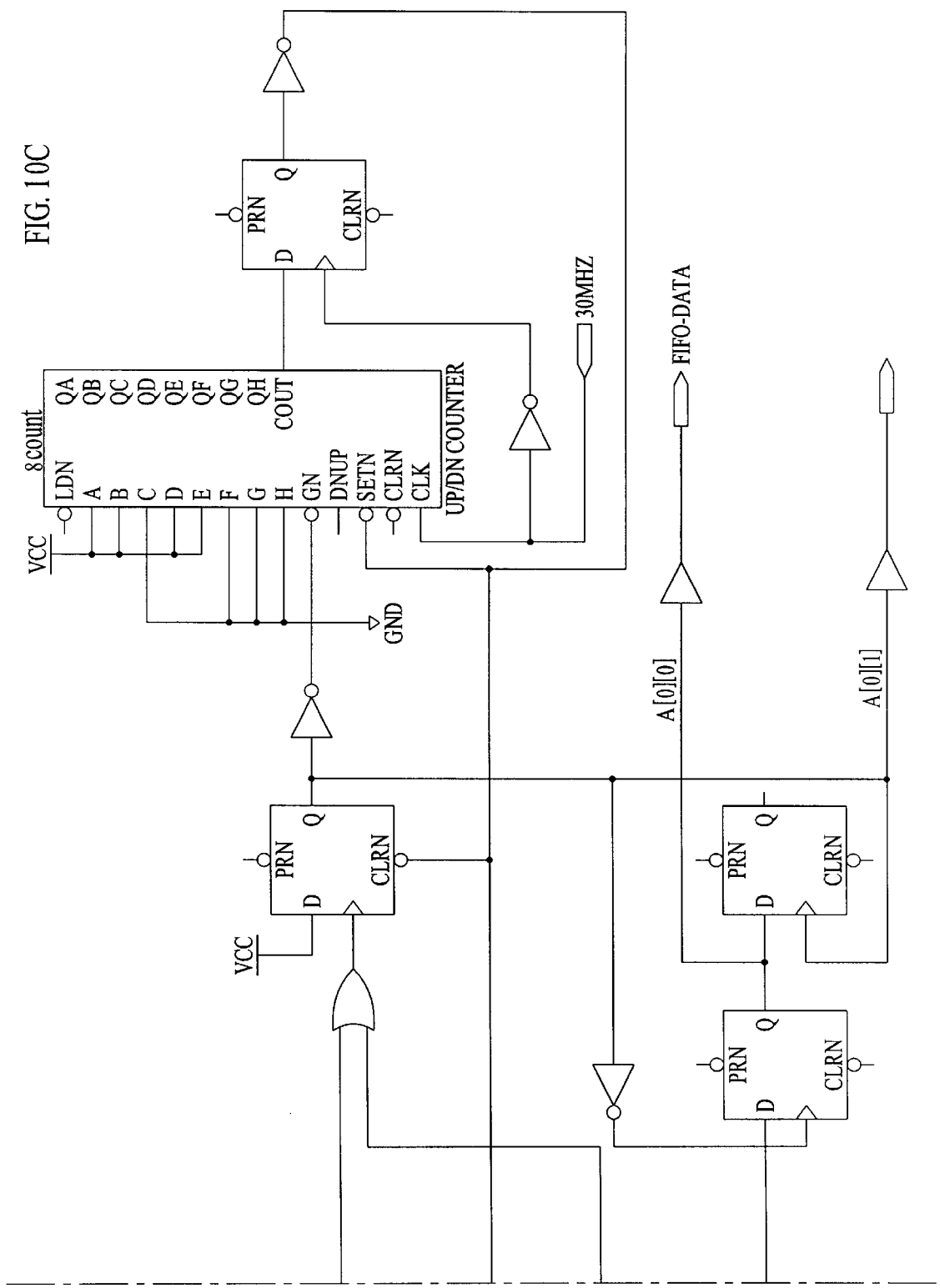
Figure 10D:
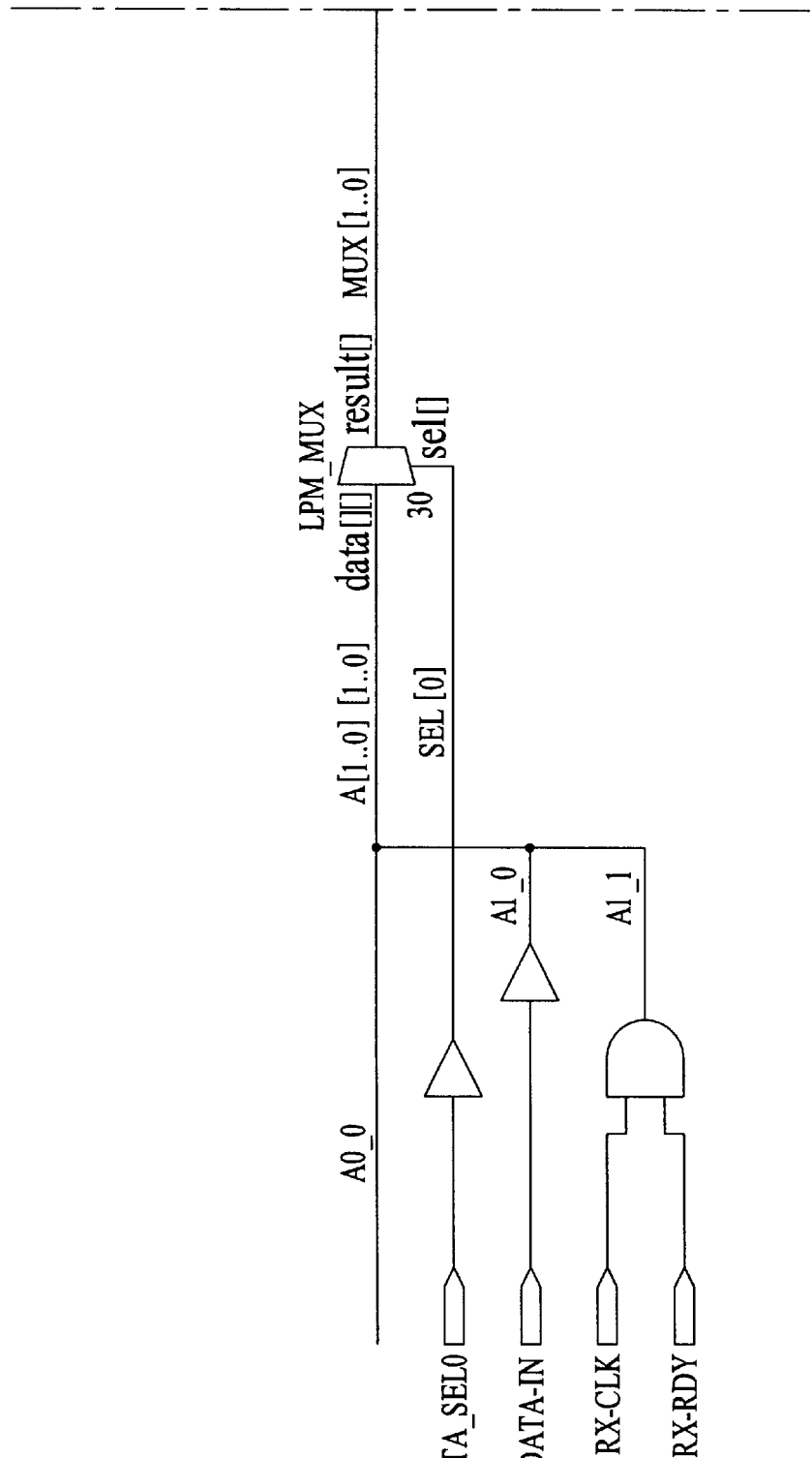
Figure 10E:
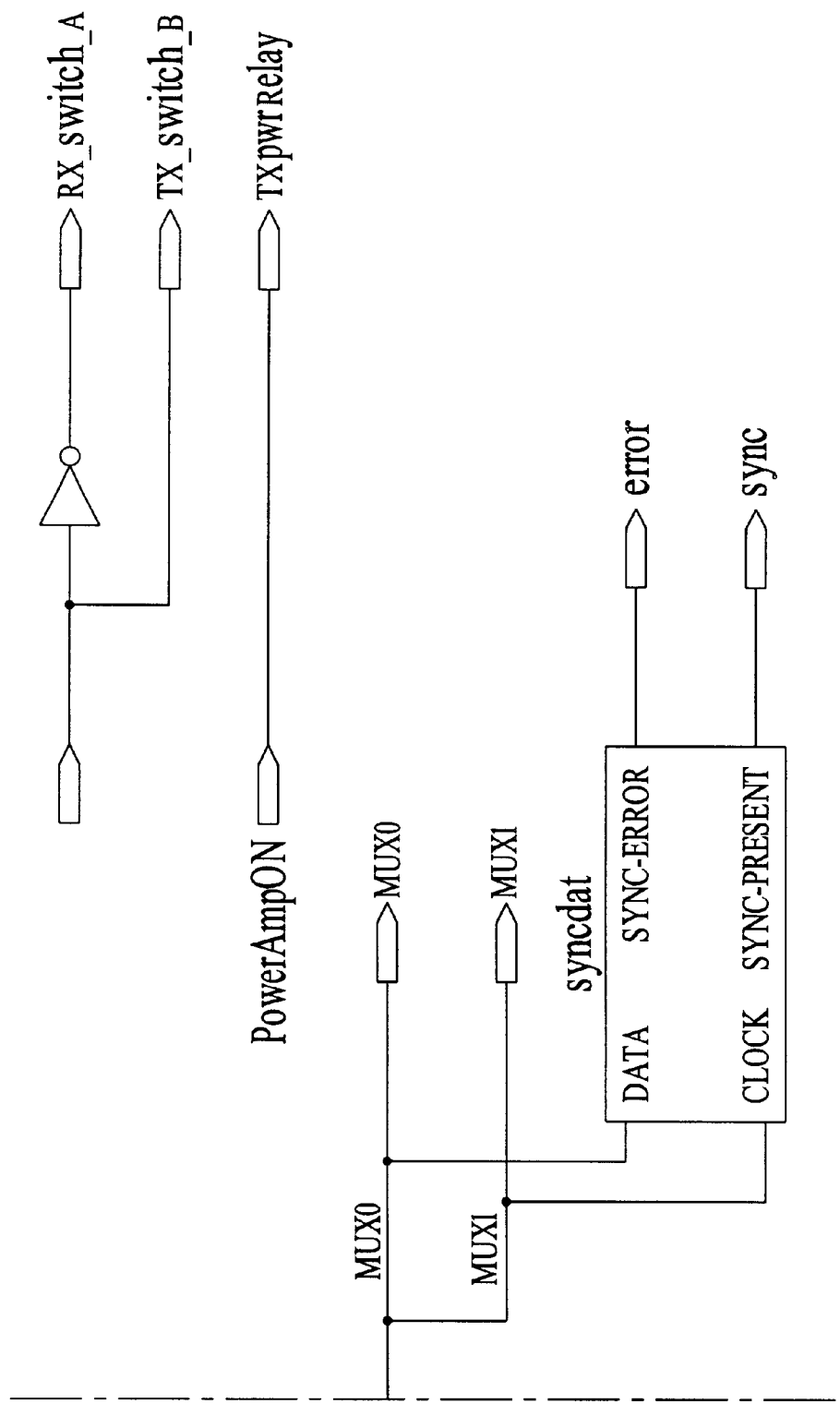
Figure 11B:
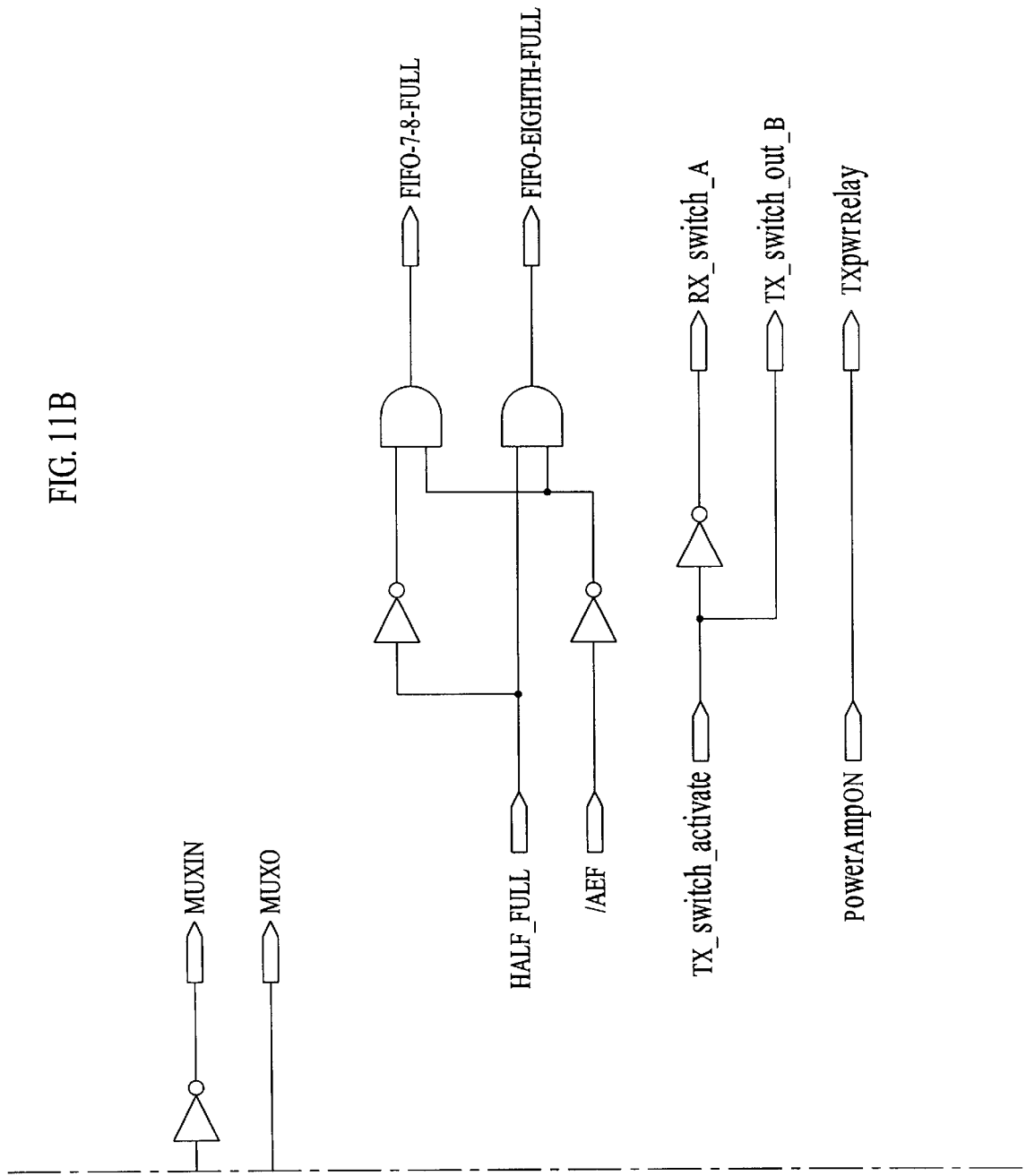
FIG. 11 (references to FIG. 11 herein refer collectively to FIGS. 11A, 11B, 11C, 11D and 11E) is an example of a circuit diagram for implementing controller 126 of the second transceiver node represented in FIG. 4.
Figure 11C:
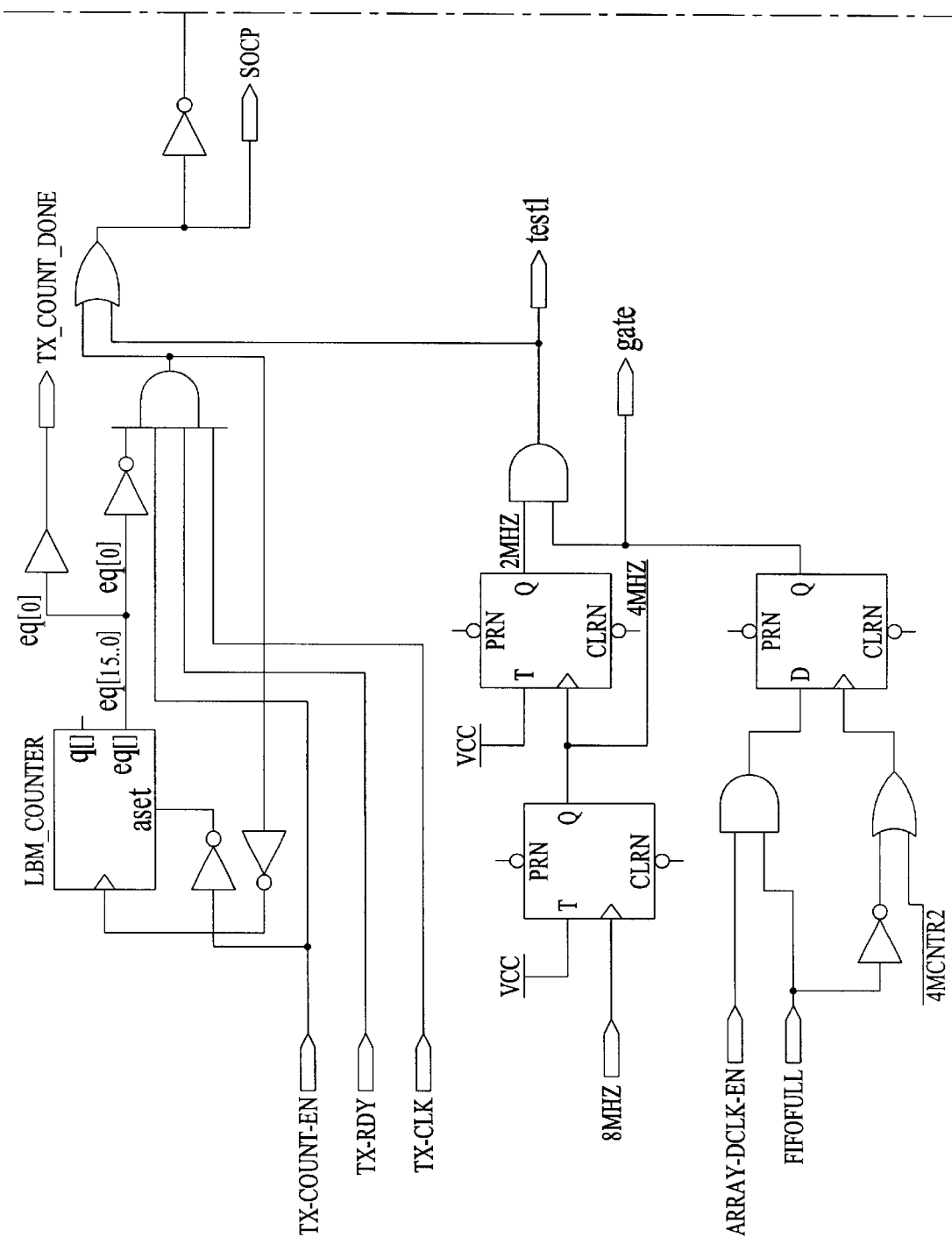
Figure 11D:
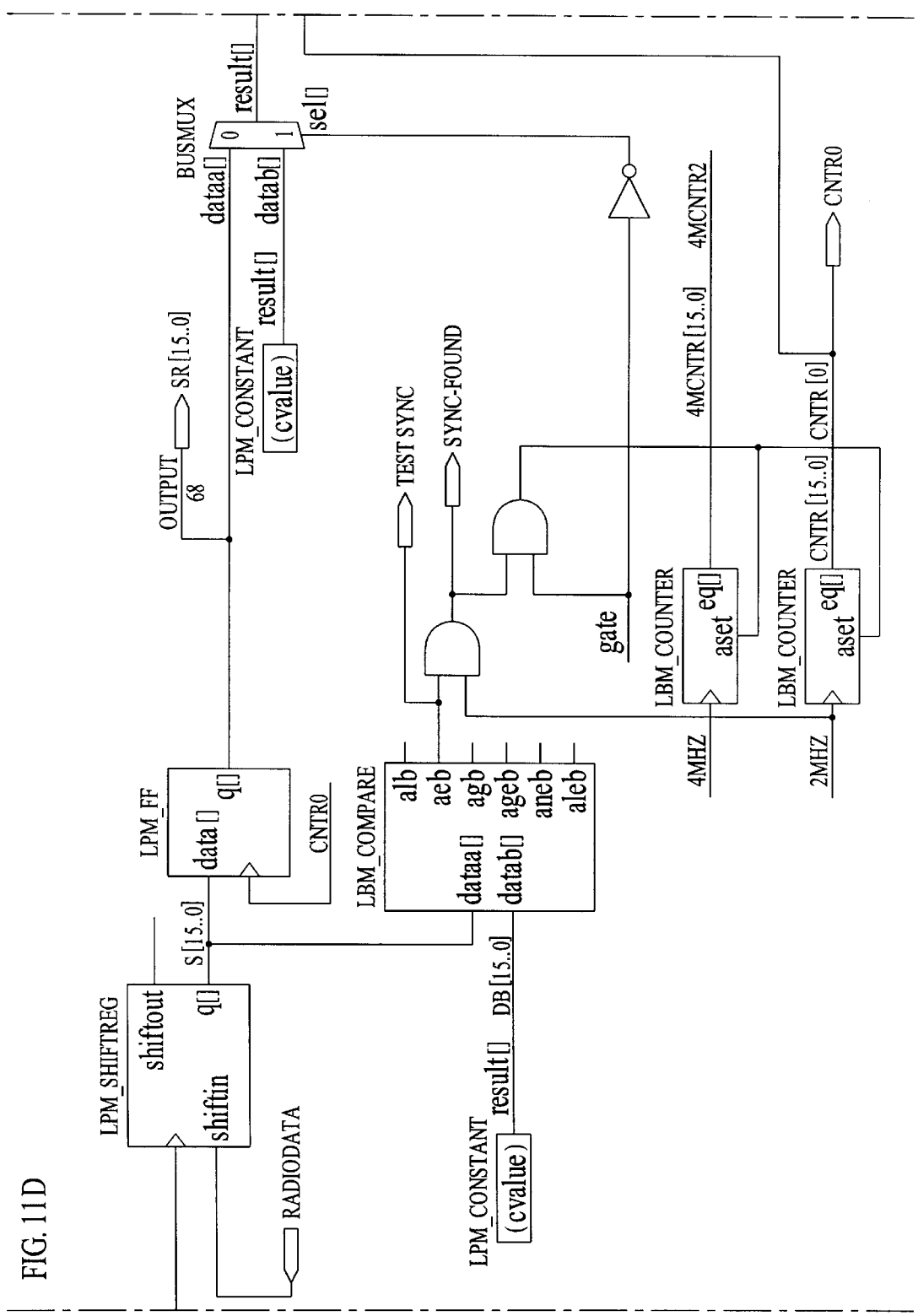
Figure 11E:
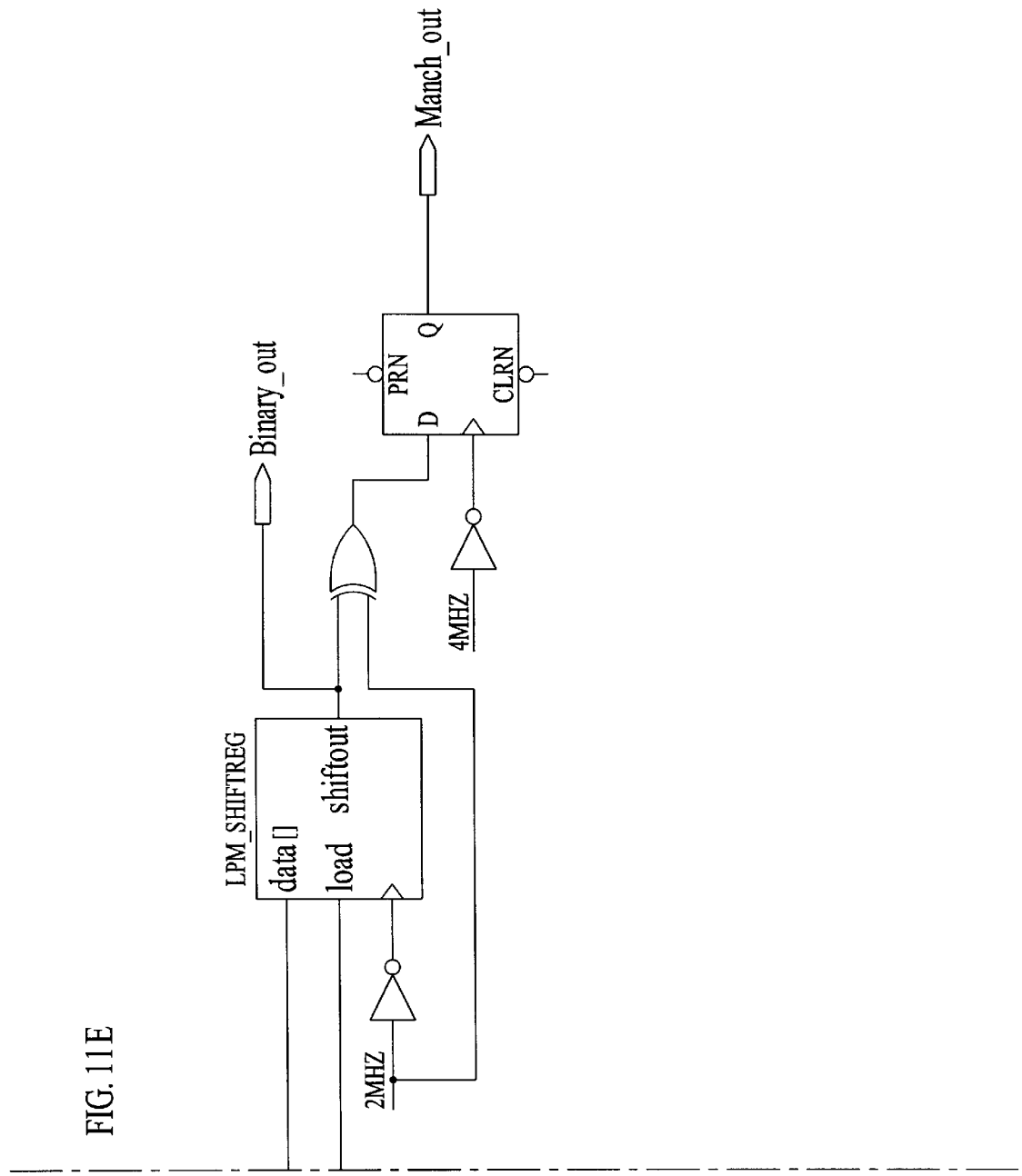

An example of one implementation of second transceiver node 14 is described with reference to the block diagram of FIG. 4 and the flow chart presented in FIGS. 5. The principal elements of node 14 are a controller 120, controller 126, FIFO 131, transceiver 128, amplifier 130, T/R switch 132, antenna 134, and data recording system 170. By way of example, controller 120 may implemented as an Onset Computer Tattletale Model 8, and controller 126 may be an Altera EPF8282 programmable logic device. Software programming instructions suitable for effectuating the functions of controller 120 are presented in APPENDIX 2, by way of example, and are written in the C programming language. Temporary storage device 48 is preferably implemented as a FIFO 131 memory device preferably containing 36,864 bits. Transceiver 128 may be a Harris PRISM radio chipset. Circuit diagrams showing the interconnections of controller 120 and transceiver 128 are presented by way of example in FIGS. 8 and 9. An example of a schematic diagram for implementing controller 126 is presented in FIG. 11. FIG. 12 presents is a schematic representation of the sync detectors (syncdet) shown in both FIGS. 10 and 11.

The operation of second transceiver node 14 is described with reference to FIGS. 4 and 5. At step 250, controller 120 is initialized by turning on its power whereupon it runs through a self-initialization process. At step 252, controller 120 generates control signals to transceiver 128 via signal lines 156 and 158 to initialize the transceiver so that it operates in the desired operating mode and to initialize an internal packet counter within the controller 120. Controller 120 also initiates internal clocks and an oscillator in transceiver 128. In the preferred embodiment, transceiver 128 is configured to transmit in a direct sequence, spread-spectrum mode. At step 254, controller 120 resets FIFO 131 by purging its contents with a FIFO Reset command via signal line 142.

At step 256, controller 120 sends a command via signal line 122 to controller 126 that directs controller 126 to generate a T/R control signal via signal line 150. The T/R control signal disables transmitter amplifier 130 and sets T/R switch 132 to the "receive" position, so that transceiver 128 may receive RF signal 34 via antenna 134 and T/R switch 132 as $RF_{in}$ signal via signal line 166.

At step 258 controller 120 examines command input line 161 from control input device 160 to determine if a backlink command is ready to be transmitted. Control input device 160 may be a switch, a keyboard, or any other type of input device that generates a signal that may represent the desire to transmit a command. If the determination at step 258 is YES, system 14 proceeds to step 264, described below. If the determination at step 258 is NO, then system 14 continues to step 260 where controller 120 reads the FIFO status signal presented on signal line 144. All operations of FIFO 131 are synchronized by FIFO clock signals generated by controller 126 that are presented to FIFO 131 via signal line 138. At this stage, any digital data packets received via the $RF_{in}$ signal by transceiver 128 are directed as Rx Data via signal line 152 to FIFO 131 for storage. When controller 120 senses that FIFO 131 is full, the Rx data stored in FIFO 131 is directed through controller 126 to data recording system 170 via over signal line 168 upon issuance of a command via signal line 122 issued by controller 120 to controller 126. At step 262, Rx Data from FIFO 131 continues to flow through controller 126 to recording system 170 until the FIFO is empty, as sensed by controller 120 on signal line 144. The system then returns to step 258.

When the determination at step 258 is that the backlink command is ready to be sent, system 14 continues to step 264. At step 264, controller 120 sends a control command via signal line 158 to transceiver 128 which directs the transceiver to change from a receive mode to a transmit mode. Continuing to step 266, controller 120 issues a control signal vial signal line 122 that directs controller 126 to emit a T/R control signal via signal line 150 that enables transmitter amplifier 130 and sets T/R switch 132 to the transmit position.

At step 268, controller 120 issues a FIFO reset command via signal line 142, whereupon the contents of FIFO 131 are purged. Next, at step 270, the backlink command is formatted in controller 120 and at step 272, controller 120 generates the backlink command (Tx Data in FIG. 4) that is provided to controller 126 via signal line 124. Controller 126 directs the backlink command to FIFO 131 through signal line 140. The backlink command then is sent to transceiver 128 from the FIFO 131 over signal line 154.

At step 274 transceiver 128 transmits backlink command ($RF_{out}$) through signal line 162 to amplifier 130 which amplifies and transforms $RF_{out}$ and transforms into amplified RF output signal that is fed to T/R switch 132 via signal line 164 and which then radiates from antenna 134. By way of example, antenna 134 may be implemented as a Yagi antenna. At step 278, controller 120 determines if a new backlink command is to be transmitted by examining the signal presented on signal line 161. If the determination at step 278 is NO, system 14 continues to step 254. If the determination at step 278 is YES, system 14 returns to step 268.

In FIG. 13, there is shown first transceiver node 12 that is supported in a buoy 300 which floats at the surface 303 of the ocean 301 or other large body of water having a bottom 306. Transceiver node 12 is light and compact to the extent that buoy 300 may be implemented as a sphere having a diameter of about 1 meter and have a mass no more than about 40 kg. However, it is to be understood that the scope of the invention includes buoys having other suitable shapes. A sensor array 308 comprises multiple sensors 304 linked by a signal transmission line 302 that is connected to and provides data to first transceiver node 12. Transceiver node 12 processes the data as described above and transmits the data as an RF signal 34 to second transceiver node 14 which may be remotely located on shore 310. By way of example, sensor array 308 may be a linear sensor array that includes a signal transmission line and sensors of the type described in U.S. Pat. No. 5,663,927, now Reissue application Ser. No. 09/067,697, filed Apr. 28, 1998, both of which are incorporated in their entirety herein by reference.

Obviously, many modifications and variations of the present invention are possible in light of the above teachings. It is therefore to be understood that within the scope of the appended claims, the invention may be practiced otherwise than as specifically described.

We claim:

1. A communications node, comprising:
    a transceiver for transmitting digital data packets and for receiving a backlink command signal;
    a FIFO buffer operably coupled to said transceiver for storing said digital data packets; and
    a controller operably coupled to said transceiver and said FIFO buffer for
        1) initializing a counter and resetting said FIFO buffer;
        2) determining if a predetermined number of said digital data packets have been transmitted;
        3) directing said transceiver to transmit said digital data packets after said FIFO buffer is partially filled with said digital data packets if the number of said digital data packets transmitted is less than said predetermined number, incrementing said counter, and then returning to said step (2);
        4) directing said transceiver to be in a receive mode if said predetermined number of said digital data packets have been transmitted;
        5) determining if said backlink command signal has been detected;
        6) processing a backlink command if said backlink command signal has been detected, and then directing said transceiver to be in transmit mode, clearing said counter, and returning to said step (2); and
        7) setting said transceiver to be in a transmit mode if no backlink command signal is detected, and then clearing said counter and returning to step (2).

2. The communications node of claim 1 wherein said transceiver includes a direct sequence, spread spectrum transmitter.

3. A communications system, comprising:
    a first communications node that includes:
        a first transceiver for transmitting digital data packets and for receiving a backlink command signal;
        a first FIFO buffer operably coupled to said first transceiver for storing said digital data packets; and
        a first controller operably coupled to said first transceiver and said first FIFO buffer for
            1) initializing a counter and resetting said first FIFO buffer;
            2) determining if a predetermined number of said digital data packets have been transmitted;
            3) directing said transceiver to transmit said digital data packets after said first FIFO buffer is partially filled with said digital data packets if the number of said digital data packets transmitted is less than said predetermined number, incrementing said counter, and then returning to said step (2);
            4) directing said first transceiver to be in a receive mode if said predetermined number of said digital data packets have been transmitted;
            5) determining if said backlink command signal has been detected;
            6) processing a backlink command if said backlink command signal has been detected, and then directing said first transceiver to be in transmit mode, clearing said counter, and returning to said step (2); and
            7) setting said first transceiver to be in a transmit mode if no backlink command signal is detected, and then clearing said counter, and returning to step (2);
    a second communications node that includes;
        a second transceiver for receiving said digital data packets and transmitting said backlink command signal.

4. The communication system of claim 3 wherein said first and second transceivers each includes a direct sequence, spread spectrum transmitter.

* * * * *